(12) United States Patent
Ohyama et al.

(10) Patent No.: US 10,473,918 B2
(45) Date of Patent: Nov. 12, 2019

(54) IMAGE DRAWING DEVICE AND IMAGE DRAWING METHOD THAT DETECTS AND CONTROLS LASER LIGHT

(71) Applicant: JVC KENWOOD Corporation, Yokohama-shi, Kanagawa (JP)

(72) Inventors: Minoru Ohyama, Yokohama (JP); Tatsuya Nakano, Yokohama (JP)

(73) Assignee: JVCKENWOOD Corporation, Kanagawa (JP)

(*) Notice: Subject to any disclaimer, the term of this patent is extended or adjusted under 35 U.S.C. 154(b) by 321 days.

(21) Appl. No.: 15/455,712

(22) Filed: Mar. 10, 2017

(65) Prior Publication Data
US 2017/0248781 A1 Aug. 31, 2017

Related U.S. Application Data

(63) Continuation of application No. PCT/JP2015/004555, filed on Sep. 8, 2015.

(30) Foreign Application Priority Data

Sep. 12, 2014 (JP) ................. 2014-186258
Sep. 12, 2014 (JP) ................. 2014-186259
Sep. 12, 2014 (JP) ................. 2014-186260

(51) Int. Cl.
*G09G 5/02* (2006.01)
*G02B 26/10* (2006.01)
(Continued)

(52) U.S. Cl.
CPC ............. *G02B 26/10* (2013.01); *G02B 27/01* (2013.01); *G02B 27/0101* (2013.01); *G09G 3/02* (2013.01);
(Continued)

(58) Field of Classification Search
None
See application file for complete search history.

(56) References Cited

U.S. PATENT DOCUMENTS

2006/0255243 A1  11/2006  Kobayashi et al.
2009/0092161 A1*  4/2009  Hung .................. G02B 26/105
                                                 372/29.01
(Continued)

FOREIGN PATENT DOCUMENTS

EP      2731093 A1    5/2014
JP      2003066364 A  3/2003
(Continued)

*Primary Examiner* — Lunyi Lao
*Assistant Examiner* — Kirk W Hermann
(74) *Attorney, Agent, or Firm* — Procopio, Cory, Hargreaves & Savitch LLP

(57) ABSTRACT

An image drawing device includes a laser light source controller controlling a laser light output timing of a laser light source unit and an output value of laser light so that a drawing image based on input image data is generated in a scanning region; a scanner controller controlling scanning so that the laser light is scanned with an amplitude; and a characteristic detection controller controlling the scanner controller to scan in a range in which an amplitude of scanning exceeds a scanning range corresponding to an amplitude when the laser light output value is adjusted, control the laser light source controller to output characteristic detection laser light during scanning outside of a range in which the drawing image is generated and beyond the amplitude of the scanning range, and adjust the output value of the laser light based on a detected output value of the characteristic detection laser light.

9 Claims, 21 Drawing Sheets

(51) Int. Cl.
  *G02B 27/01* (2006.01)
  *G09G 3/02* (2006.01)
  *H04N 5/74* (2006.01)
(52) U.S. Cl.
  CPC ....... *H04N 5/74* (2013.01); *G09G 2310/0283* (2013.01); *G09G 2320/064* (2013.01); *G09G 2320/0633* (2013.01); *G09G 2320/0646* (2013.01); *G09G 2320/0666* (2013.01)

(56) References Cited

U.S. PATENT DOCUMENTS

| | | | |
|---|---|---|---|
| 2010/0302513 A1 | 12/2010 | Takahashi et al. | |
| 2012/0013806 A1* | 1/2012 | Hsieh | G09G 5/00 348/581 |
| 2015/0022568 A1* | 1/2015 | Ishii | G03B 21/2013 345/697 |

FOREIGN PATENT DOCUMENTS

| | | | |
|---|---|---|---|
| JP | 2006192633 A | | 7/2006 |
| JP | 2009244361 A | | 10/2009 |
| JP | 2011191454 A | | 9/2011 |
| JP | 2011215398 A | | 10/2011 |
| JP | 2011221217 A | * | 11/2011 |
| JP | 2013-164503 A | | 8/2013 |

\* cited by examiner

LASER DRIVE DATA

IMAGE DRAWING DEVICE AND IMAGE DRAWING METHOD THAT DETECTS AND CONTROLS LASER LIGHT

CROSS REFERENCE TO RELATED APPLICATION

This application is continuation application from PCT application No: PCT/JP2015/004555 filed Sep. 8, 2015, which claims the benefit of priority from Japanese patent application No. 2014-186258, filed on Sep. 12, 2014, Japanese patent application No. 2014-186259, filed on Sep. 12, 2014, and Japanese patent application No. 2014-186260, filed on Sep. 12, 2014, the disclosures of which is incorporated herein in its entirety by reference.

BACKGROUND

The present invention relates to an image drawing device and an image drawing method.

As a technique of this type, Patent Literature 1 (Japanese Unexamined Patent Application Publication No. 2013-164503) discloses a laser projector for displaying a desired image on a screen by two-dimensionally scanning laser light output from a semiconductor laser. In general, I-L characteristics indicating the relationship between a drive current and the amount of output light of a laser light source such as a semiconductor laser are easily changed due to a temperature fluctuation of the laser light source itself. Accordingly, in Patent Literature 1, the drive current of the laser light source is adjusted appropriately during a time when the laser light is blocked by a masking shield, thereby suppressing an error in the output value due to a temperature fluctuation of the laser light source itself.

SUMMARY

Incidentally, the applicant of the present application has developed the APC (Auto Power Control) technique in which laser light (hereinafter referred to as characteristic detection laser light) for detecting an output value of laser light from a laser light source at any timing is output; the amount of output laser light is measured by a photodiode to thereby acquire the actual amount of light with respect to a predetermined drive current; and the drive current for the laser light source is adjusted based on the acquired amount of light. In the APC technique, like in Patent Literature 1 described above, the direction in which the laser light for adjustment is irradiated is blocked using a masking shield or the like so as to prevent the characteristic detection laser light from reaching a range in which drawing images are presented to a user on a screen or the like.

An image drawing region and a blanking region will now be described. The above-mentioned two-dimensional scanning region (hereinafter referred to as a scanning region) is divided into an image drawing region and a blanking region. The image drawing region is a region in which laser light is emitted based on drawing image data so as to draw an image to be displayed on the screen. In general, the image drawing region has a rectangular shape. The blanking region is a region in which laser light for drawing an image is not emitted and is in the periphery of the image drawing region.

During execution of the above-mentioned APC, even when the characteristic detection laser light is irradiated, the laser light is blocked by a masking shield or the like, and thus the laser light in the characteristic detection has no direct effect on the image to be drawn in the image drawing region. However, stray light generated due to a diffuse reflection of the characteristic detection laser light may be displayed in the image drawing region. This leads to degradation of the quality of the image to be drawn in the image drawing region.

In order to solve the above-mentioned problem, this embodiment provides an image drawing device including: a laser light source unit configured to output laser light; a scanner configured to scan the laser light output from the laser light source unit by reflecting the laser light; a laser light source controller configured to control a laser light output timing of the laser light source unit and an output value of the laser light so that a drawing image based on input image data is generated by scanning of the scanner in a scanning region scanned by the scanner, and controls the laser light source unit to output characteristic detection laser light for detecting the output value of the laser light output from the laser light source unit; a scanner controller configured to control scanning of the scanner so that the scanner scans the laser light with a predetermined amplitude; and a characteristic detection controller configured to control the scanner controller so that the scanner performs scanning in a range in which an amplitude of scanning of the scanner exceeds a scanning range corresponding to the predetermined amplitude when an output value of the laser light output from the laser light source unit is adjusted, control the laser light source controller to output the characteristic detection laser light during scanning in a region which is outside of a region in which the drawing image is generated and beyond the scanning range corresponding to the predetermined amplitude, and adjust the output value of the laser light based on a detection result of the output value of the characteristic detection laser light.

Further, this embodiment provides an image drawing method for generating a drawing image by causing a scanner configured to scan laser light output from a laser light source unit with a predetermined amplitude to reflect the laser light, the image drawing method including: performing scanning in a range in which an amplitude of scanning of the scanning unit exceeds a scanning range corresponding to the predetermined amplitude, when an output value of the laser light output from the laser light source unit is adjusted; outputting characteristic detection laser light for detecting an output value of the laser light during scanning in a range which is outside of a region in which the drawing image is generated and beyond the scanning range corresponding to the predetermined amplitude; and adjusting the output value of the laser light based on a detection result of the output value of the characteristic detection laser light.

DETAILED DESCRIPTION (First Embodiment)

Figure 1:
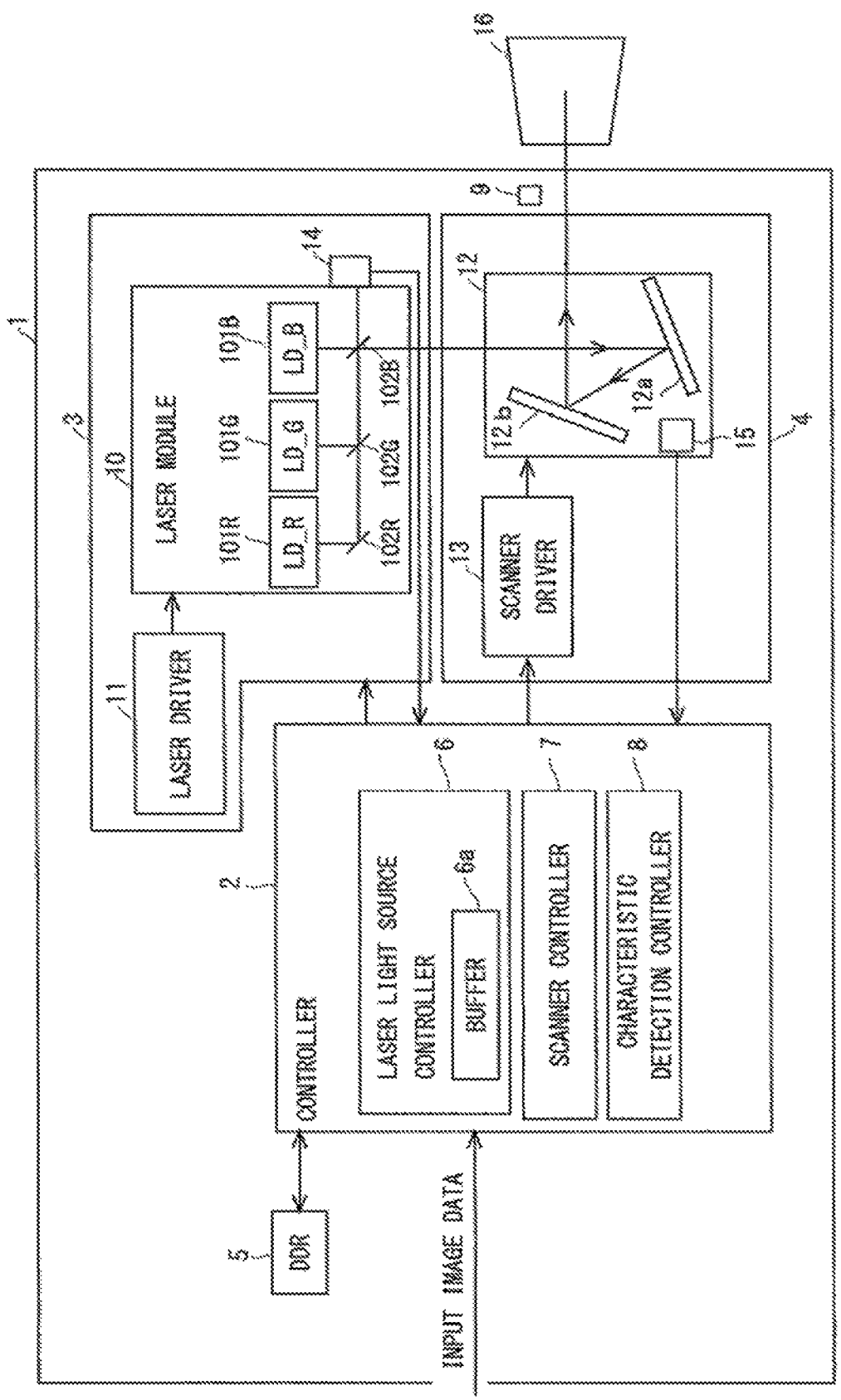
FIG. 1 is a functional block diagram of an image drawing device (first embodiment)

A first embodiment will be described below with reference to the drawings. FIG. 1 shows a functional block diagram of an image drawing device 1 of the first embodiment. Specifically, the image drawing device 1 is a head-up display device which is mainly mounted in a vehicle and presents various pieces of information, as virtual images, to a driver who is a user of the image drawing device. When the image drawing device 1 is used as a head-up display device, the image drawing device presents images, such as images for routing assistance, images for warning, images based on content reproduction, and images for various UIs (User Interfaces), as virtual images based on drawing images. These images may be still images or moving images.

The image drawing device 1 includes a controller 2, a laser light source unit 3, a scanner 4, a DDR memory 5 (Double Data Rate), and a masking shield 9 serving as shield means.

The controller 2 includes, for example, a central processing unit (CPU) (not shown), a random access memory (RAM), and a read only memory (ROM). The CPU reads an image drawing program stored in the ROM and executes the image drawing program, thereby causing hardware such as the CPU to function as a laser light source controller 6, a scanner controller 7, and a characteristic detection controller 8.

The laser light source unit 3 includes a laser module 10 which outputs laser light, and a laser driver 11 which drives laser diodes 101 included in the laser module 10. In this embodiment, the laser module 10 includes a red laser diode 101R, a green laser diode 101G, a blue laser diode 101B, dichroic mirrors 102 respectively corresponding to the laser diodes 101, and a photodiode 14. Laser light beams of the respective colors output from the laser diodes 101 included in the laser module 10 are synthesized by the dichroic mirrors 102 and output to the scanner 4. The laser driver 11 drives the laser diodes 101 included in the laser module 10 on the basis of a laser drive signal from the controller 2.

A dichroic mirror 102R has a characteristic of reflecting substantially 100% of light having a red wavelength output from the red laser diode 101R. A dichroic mirror 102G has a characteristic of transmitting substantially 100% of the light having the red wavelength output from the red laser diode 101R and reflecting substantially 100% of light having a green wavelength output from the green laser diode 101G. A dichroic mirror 102B has a characteristic of reflecting about 98% of the light having the red wavelength output from the red laser diode 101R and the light having the green wavelength output from the green laser diode 101G and transmitting about 2% of the light. The dichroic mirror 102B also has a characteristic of transmitting about 98% of light having a blue wavelength output from the blue laser diode 101B and reflecting about 2% of the light.

With the configuration of the dichroic minors 102 as described above, the scanner 12 reflects about 98% of the laser light output from each laser diode 101, and about 2% of the laser light is incident on the photodiode 14. The photodiode 14 serves as light amount measuring means to measure the amount of incident laser light beams and output the measurement results to the controller 2. The arrangement of the laser diode 101 and the dichroic mirror 102 is not limited to the arrangement shown in FIG. 1, and any arrangement may be adopted as long as the scanner 4 and the photodiode 14 output light in the same manner as described above.

The scanner 4 includes: a scanner 12 which scans the laser light output from the laser light source unit 3 by reflecting the laser light; a scanner driver 13 which drives the scanner 12; and a scan angle detection unit 15 serving as scan angle detecting means for detecting the scan angle of the scanner 12. The scanner 12 includes a vertical mirror 12a which scans the laser light in the vertical direction (first scanning direction), and a horizontal mirror 12b which scans the laser light in the horizontal direction (second scanning direction). The vertical minor 12a and the horizontal mirror 12b are each formed of a MEMS (micro electro mechanical system) mirror. The scanner driver 13 drives the scanner 12 on the basis of a scanner drive signal from the controller 2. The scan angle detection unit 15 detects the scan angle of each of the vertical mirror 12a and the horizontal mirror 12b, and outputs the detection results to the controller 2.

When the scanner 12 is composed of the vertical mirror 12a and the horizontal mirror 12b, the vertical mirror 12a operates at a scan angle and a swing frequency which are generally controlled by the scanner driver 13. Since the swing frequency of the horizontal mirror 12b is high, the horizontal mirror 12b generally operates at a scan angle and a swing frequency by resonance. However, the horizontal minor 12b may also be configured to operate at a scan angle and a swing frequency which are, like the vertical mirror 12a, controlled by the scanner driver 13.

The laser light output from the laser light source unit 3 is scanned by the scanner 4 on the basis of input image data input to the controller 2, so that a drawing image is generated. In the example shown in FIG. 1, the laser light scanned by the scanner 4 is projected onto a screen 16. When the image drawing device 1 is used as a head-up display device, an intermediate image screen is generally used as the screen 16. Although the structure of the head-up display is not shown, drawing images projected onto the intermediate image screen are projected onto a combiner or a windshield of a vehicle through reflection of a concave mirror or the like.

The DDR memory 5 is a frame buffer which temporarily stores the input image data input to the controller 2.

The masking shield 9 is a plate for blocking laser light. The laser light blocked by the masking shield 9 is not transmitted in the projection direction beyond the screen 16. The masking shield 9 is configured not to block laser light in a range in which drawing images are drawn among the laser light beams reflected by the scanner 4, and to block characteristic detection laser light. The masking shield 9 is formed using a casing of the image drawing device 1, or a casing of unit including the scanner 4 and the laser light source unit 3. When the scanner 4 is installed as a module in the image drawing device 1, the masking shield 9 may be installed at a position where laser light is emitted from the module, at a position where laser light is emitted from the casing of the image drawing device 1 to the screen 16, or at a front portion or a rear portion of the screen 16.

Figure 2:
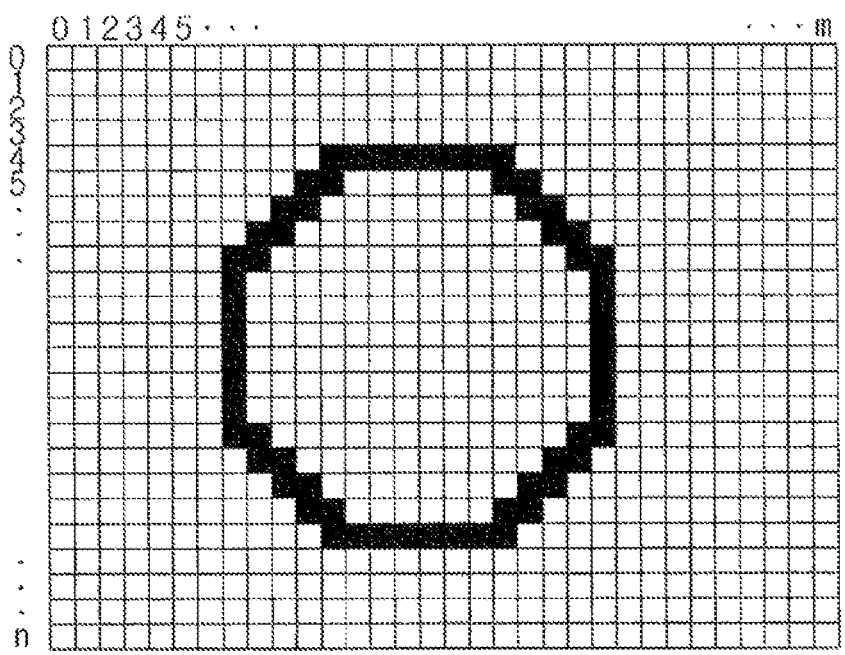
FIG. 2 is a diagram showing an example of input image data (first embodiment)
Figure 3:
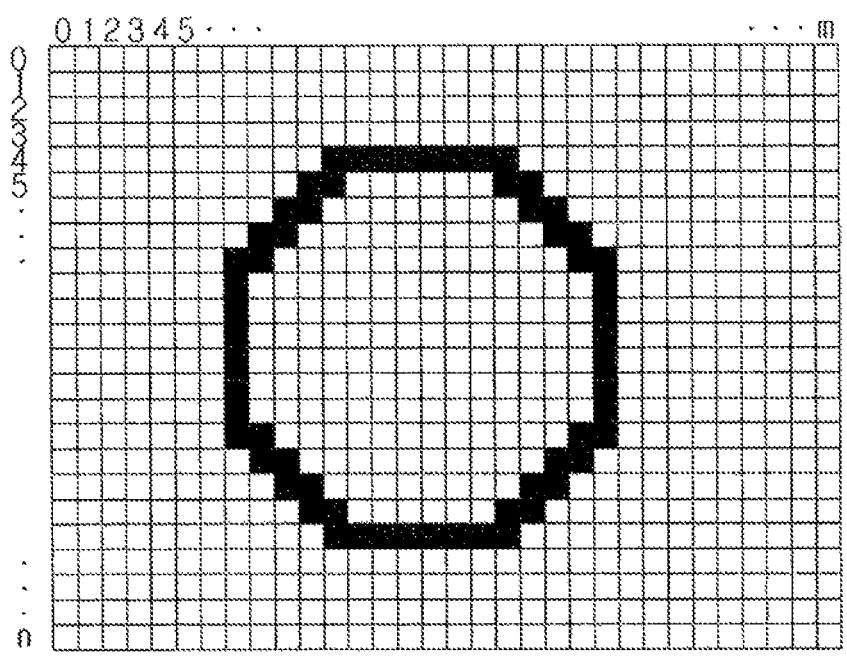
FIG. 3 is a diagram schematically showing an example of laser drive data (first embodiment)

The laser light source controller 6 is a functional unit that controls the output of the laser diodes 101 by outputting the laser drive signal to the laser driver 11. The laser light source controller 6 includes a laser drive signal frame buffer 6a. The laser light source controller 6 reads the input image data corresponding to one frame from the DDR memory 5, and stores the read input image data directly in the laser drive signal frame buffer 6a as laser drive data. FIG. 2 shows an example of a drawing image corresponding to one frame of the input image data. For convenience of explanation, the pixel size of the input image data is represented by n rows and m columns. Assume that a red complete circle is formed at the center as an image of the input image data. FIG. 3 shows the laser drive data. The laser drive data is configured to generate an image corresponding to one frame, which is represented by a pixel size of n rows and m columns, in synchronization with scanning of the scanner 4. As shown in FIGS. 2 and 3, the laser drive data is generally identical with the input image data. The laser light source controller 6 sequentially outputs, to the laser driver 11, the laser drive data stored in the laser drive signal frame buffer 6a as laser drive signals in accordance with a dot clock. Therefore, the laser light source controller 6 controls the output timing of the laser light so that the drawing image based on the input image data is generated by scanning of the scanner 4 in a scanning range scanned by the scanner 4. Further, the laser light source controller 6 controls driving of the red, blue, and green laser diodes so as to obtain an appropriate output value according to the color and luminance of the drawing image based on the input image data.

Figure 4:
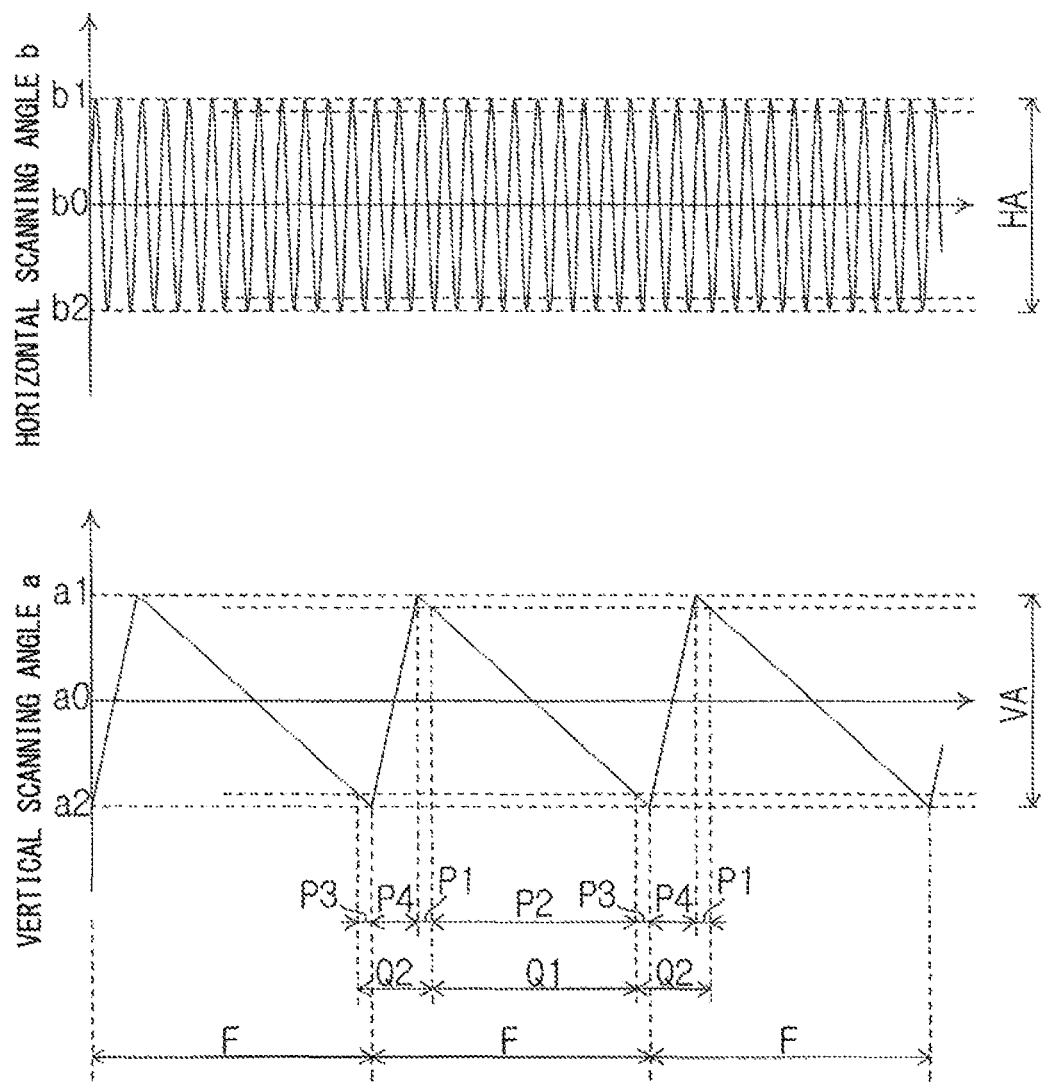
FIG. 4 is a graph schematically showing time variations of a vertical scan angle and a horizontal scan angle (first embodiment)
Figure 5:
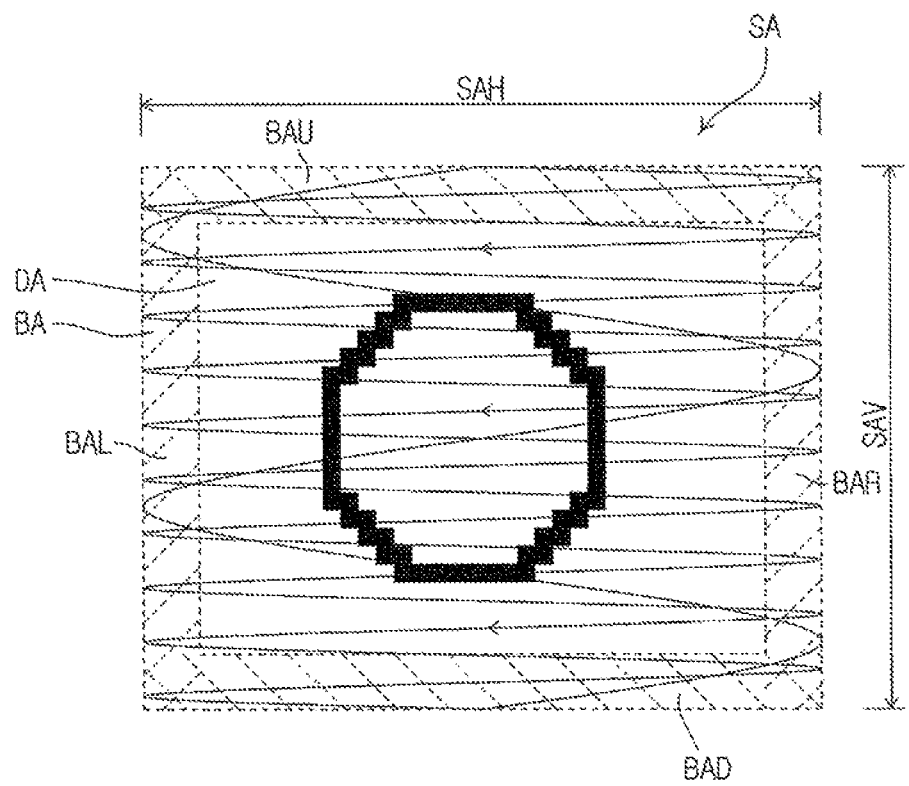
FIG. 5 is a diagram schematically showing a locus of scanning (first embodiment)

The scanner controller 7 is a functional unit that controls scanning of the laser light by the scanner 12 by outputting the scanner drive signal to the scanner driver 13. FIG. 4 shows examples of a vertical scan angle "a" of the vertical mirror 12a and a horizontal scan angle "b" of the horizontal mirror 12b. As shown in FIG. 4, the vertical scan angle "a" is represented by a chopping wave and the horizontal scan angle "b" is represented by a sine wave. The amplitude and scanning center of the vertical scan angle "a" are constant, and the amplitude and scanning center of the horizontal scan angle "b" are also constant. The scanning frequency of the vertical mirror 12a is, for example, 60 Hz. The scanning frequency of the horizontal mirror 12b is, for example, 15 kHz, which is higher than the scanning frequency of the vertical mirror 12a. Herein, for convenience of explanation, the scanning frequency of the horizontal mirror 12b is 12 times as high as the scanning frequency of the vertical mirror 12a. FIG. 5 shows a state in which the image drawing device 1 draws an image on the screen 16 on the basis of the input image data. A thin solid line in FIG. 5 indicates a locus of the scanning position of the scanner 12. As shown in FIG. 5, the locus of the scanning position of the scanner 12 falls within a rectangular frame. The region in the rectangular frame is referred to as a scanning region SA. A horizontal width SAH of the scanning region SA corresponds to an amplitude HA of the horizontal scan angle "b" shown in FIG. 4. Similarly, a vertical width SAV of the scanning region SA shown in FIG. 5 corresponds to an amplitude VA of the vertical scan angle "a" shown in FIG. 4. The scanning region SA is divided into an image drawing region DA and a blanking region BA. The image drawing region DA is a region in the scanning region SA, and is a rectangular region in which images are actually drawn. The blanking region BA is a region having a rectangular frame shape surrounding the image drawing region DA, and is a region in which laser light for drawing the drawing images is not output. The blanking region BA includes an upper blanking region BAU, a lower blanking region BAD, a left blanking region BAL, and a right blanking region BAR. The upper blanking region BAU is a region located on an upper side of the image drawing region DA in the blanking region BA. The horizontal width of the upper blanking region BAU is equal to the horizontal width SAH. The lower blanking region BAD is a region located on a lower side of the image drawing region DA in the blanking region BA. The horizontal width of the lower blanking region BAD is equal to the horizontal width SAH. The left blanking region BAL is a region located on a left side of the image drawing region DA in the blanking region BA. The vertical width of the left blanking region BAL is equal to the vertical width SAV. The right blanking region BAR is a region located on a right side of the image drawing region DA in the blanking region BA. The vertical width of the right blanking region BAR is equal to the vertical width SAV. A part of the upper blanking region BAU overlaps the left blanking region BAL and the right blanking region BAR. A part of the lower blanking region BAD overlaps the left blanking region BAL and the right blanking region BAR. Scanning of the scanner 12 will be described in detail below with reference to FIGS. 4 and 5.

As shown in FIG. 4, vertical scanning is established by sequential scanning in the following scan periods which are continuous periods on the temporal axis. That is, an upper blanking region scan period P1 during which the scanning position moves downward in the upper blanking region BAU; an image drawing region scan period P2 during which the scanning position moves downward between the upper blanking region BAU and the lower blanking region BAD; a lower blanking region scan period P3 during which the scanning position moves downward in the lower blanking region BAD; and a vertical return scan period P4 during which the scanning position moves upward in the scanning region SA. The image of the input image data is drawn on the screen 16 in the image drawing region scan period P2. No images are drawn on the screen 16 in the lower blanking region scan period P3, the vertical return scan period P4, and the upper blanking region scan period P1 which are continuous periods on the temporal axis. The image drawing region scan period P2 is hereinafter referred to as an image drawing period Q1 in which images are drawn. The periods including the lower blanking region scan period P3, the vertical return scan period P4, and the upper blanking region scan period P1, which are continuous periods on the temporal axis, are referred to as a non-image-drawing period Q2 in which no images are drawn. Accordingly, vertical scanning is established by repeatedly performing scanning in the image drawing period Q1 and the non-image-drawing period Q2 on the temporal axis. The periods including one vertical return scan period P4, one upper blanking region scan period P1, one image drawing region scan period P2, and one lower blanking region scan period P3, which are continuous periods on the temporal axis, are referred to as a frame period F as a period for one frame. Accordingly, vertical scanning is established by repeatedly performing scanning in the frame period F on the temporal axis.

The vertical scan angle "a" at the scanning center of vertical scanning is referred to as a vertical scan angle center a0; the vertical scan angle "a" during upward return of vertical scanning is referred to as an upper return scan angle a1; and the vertical scan angle "a" during lower return of vertical scanning is referred to as a lower return scan angle a2. Similarly, the horizontal scan angle "b" at the scanning center of horizontal scanning is referred to as a horizontal scan angle center b0; the horizontal scan angle "b" during rightward return of horizontal scanning is referred to as a right return scan angle b1; and the horizontal scan angle "b" during leftward return of horizontal scanning is referred to as a left return scan angle b2.

The characteristic detection controller 8 is a functional unit which periodically detects whether an appropriate amount of output light is obtained for a predetermined drive current to be applied to the laser diodes 101. For example, due to a drop in the ambient temperature, the laser diodes 101 cannot obtain the amount of light corresponding to the rated value of I-L characteristics. In this case, since the red, blue, and green laser diodes 101 have different characteristics, the hue of the drawing image to be generated is changed. Referring to FIG. 1, the characteristic detection controller 8 causes the red, blue, and green laser diodes 101 to output the characteristic detection laser light, and controls the drive current of the laser driver 11 so that the laser diodes 101 can output an appropriate amount of light based on the measurement result from the photodiode 14 which has measured the amount of the characteristic detection laser light. This processing is hereinafter referred to as APC (Auto Power Control) processing. The characteristic detection laser light is test laser light for detecting the output value of the laser light output from each laser diode 101. The characteristic detection controller 8 causes the laser light source controller 6 to feed back the detected output value, thereby optimizing the control of the laser driver 11 by the laser light source controller 6. The characteristic detection controller 8 executes the APC processing, for example, about once every 120 frames.

Further, when the characteristic detection controller 8 performs the APC processing, the characteristic detection controller 8 controls the scanner controller 7 so that the scanner 12 performs scanning with an amplitude (second amplitude) which is extended from a predetermined amplitude (first amplitude). The predetermined amplitude corresponds to the amplitude VA when the vertical mirror 12a is used, and the predetermined amplitude corresponds to the amplitude HA when the horizontal mirror 12b is used. It is appropriate for the characteristic detection processing unit 8 to execute the APC processing in the period corresponding to one frame of the drawing image. Further, when the characteristic detection controller 8 performs the APC processing, the characteristic detection controller 8 controls the laser light source controller 6 so that the characteristic detection laser light is output to the outside of the region in which the drawing image is generated.

Hereinafter, for convenience of explanation, the frame period F in which the APC processing is performed by the characteristic detection controller 8 among a plurality of frame periods F is particularly referred to as a characteristic detection frame period FIL, and the frame periods F other than the characteristic detection frame period FIL are referred to as a normal frame period FD.

The APC processing performed by the characteristic detection controller 8 in the operation of the image drawing device 1 will be described in detail below.

Figure 6:
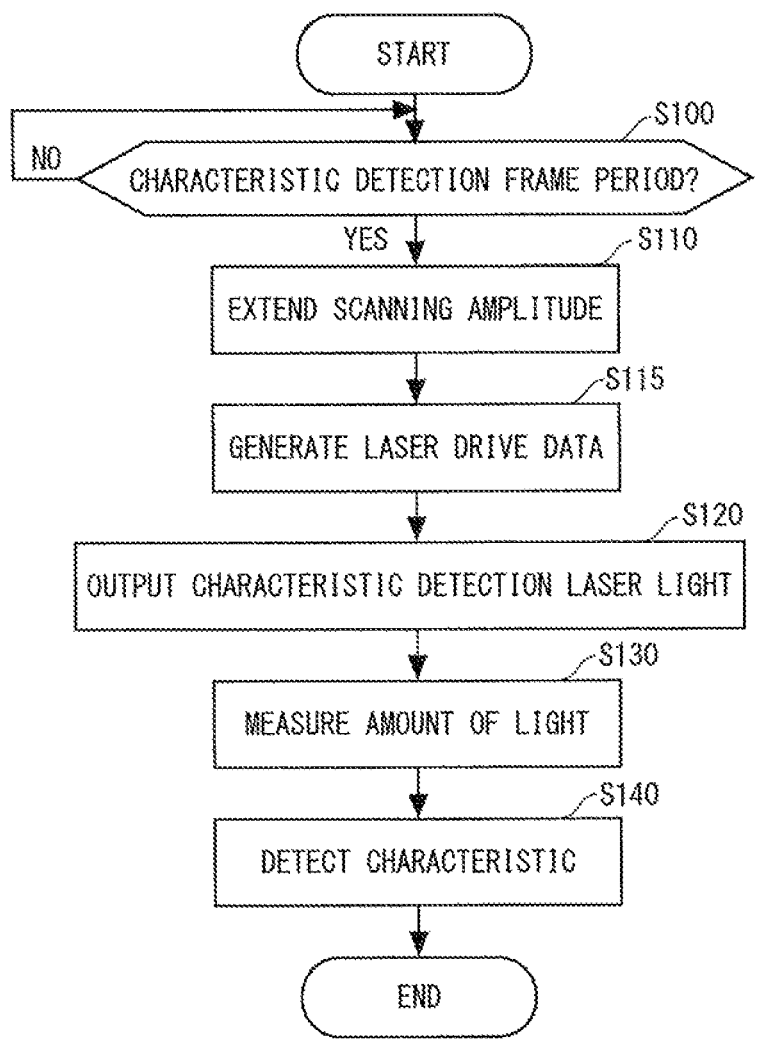
FIG. 6 is a flowchart showing a control example of the image drawing device (first embodiment)
Figure 7:
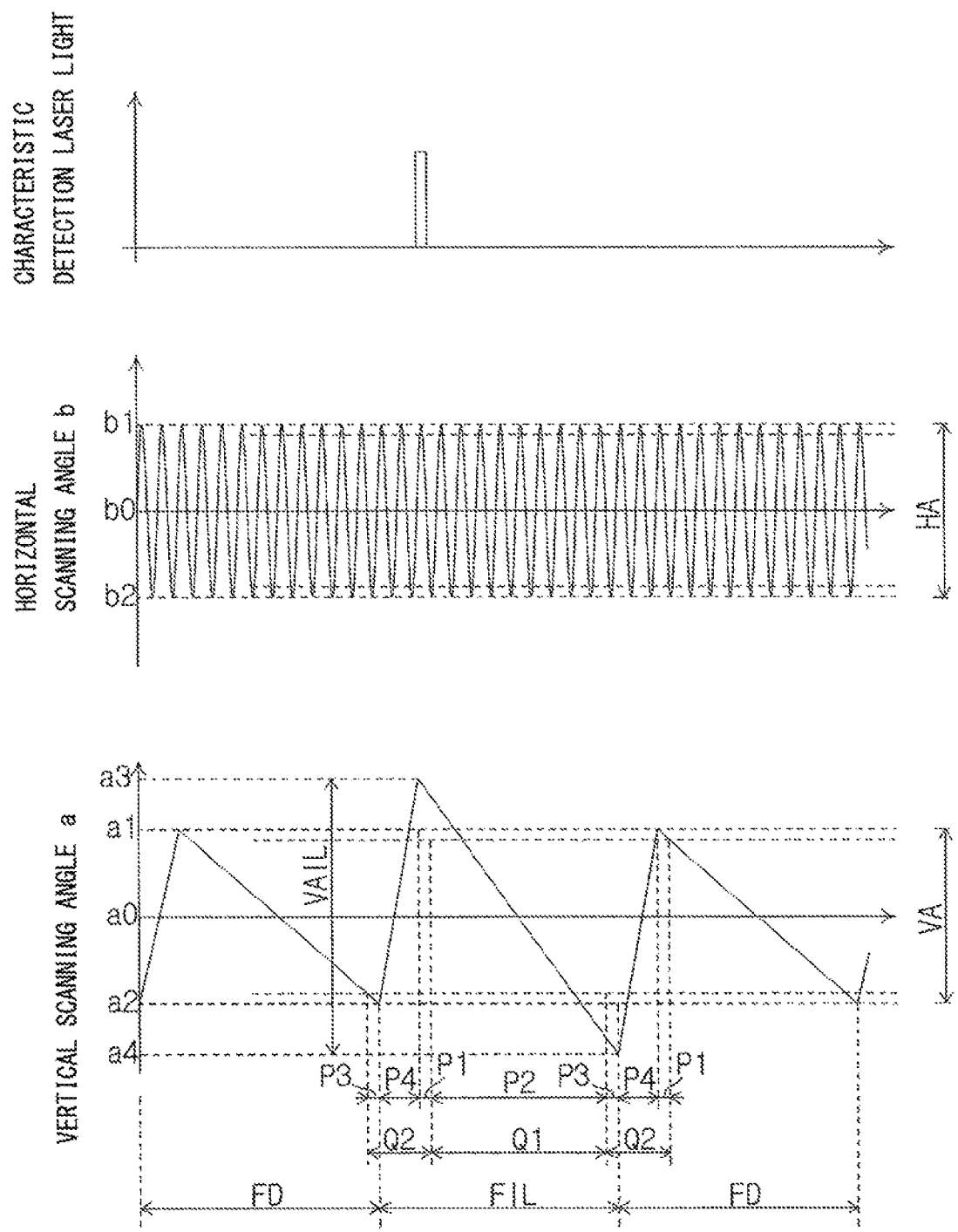
FIG. 7 is a graph schematically showing time variations of the vertical scan angle and the horizontal scan angle (first embodiment)

FIG. 6 shows a control flow of the image drawing device 1. FIG. 7 is a graph showing time variations of the vertical scan angle and the horizontal scan angle. As shown in FIG. 7, assume that the first and third frame periods F appearing on the temporal axis are the normal frame periods FD, and the second frame period F is the characteristic detection frame period FIL.

The characteristic detection controller 8 first determines whether the next frame period F is the characteristic detection frame period FIL (S100). When it is determined that the frame period F is not the characteristic detection frame period FIL (S100: NO), the next frame period F is the normal frame period FD. Accordingly, the characteristic detection controller 8 repeats the above-mentioned determination. When it is determined that the next frame period F is the characteristic detection frame period FIL (S100: YES), as shown in FIG. 7, the characteristic detection controller 8 instructs the scanner controller 7 to cause the scanner 12 to perform scanning with an extended amplitude in the characteristic detection frame period FIL (S110). In this embodiment, the scanner controller 7 extends the amplitude for vertical scanning in the characteristic detection frame period FIL. As shown in FIG. 7, the scanner controller 7 extends the amplitude for vertical scanning in the characteristic detection frame period FIL so that an amplitude VAIL for vertical scanning in the characteristic detection frame period FIL becomes larger than the amplitude VA for vertical scanning in the normal frame period FD. On the other hand, the scanner controller 7 performs horizontal scanning in the characteristic detection frame period FIL in the same manner as horizontal scanning in the normal frame period FD.

Figure 8:
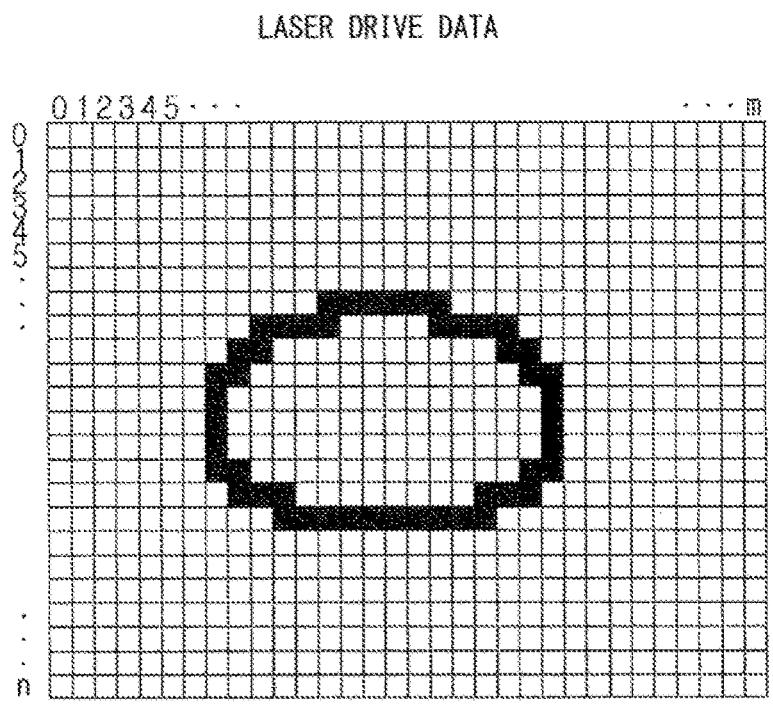
FIG. 8 is a diagram schematically showing an example of laser drive data (first embodiment)
Figure 9:
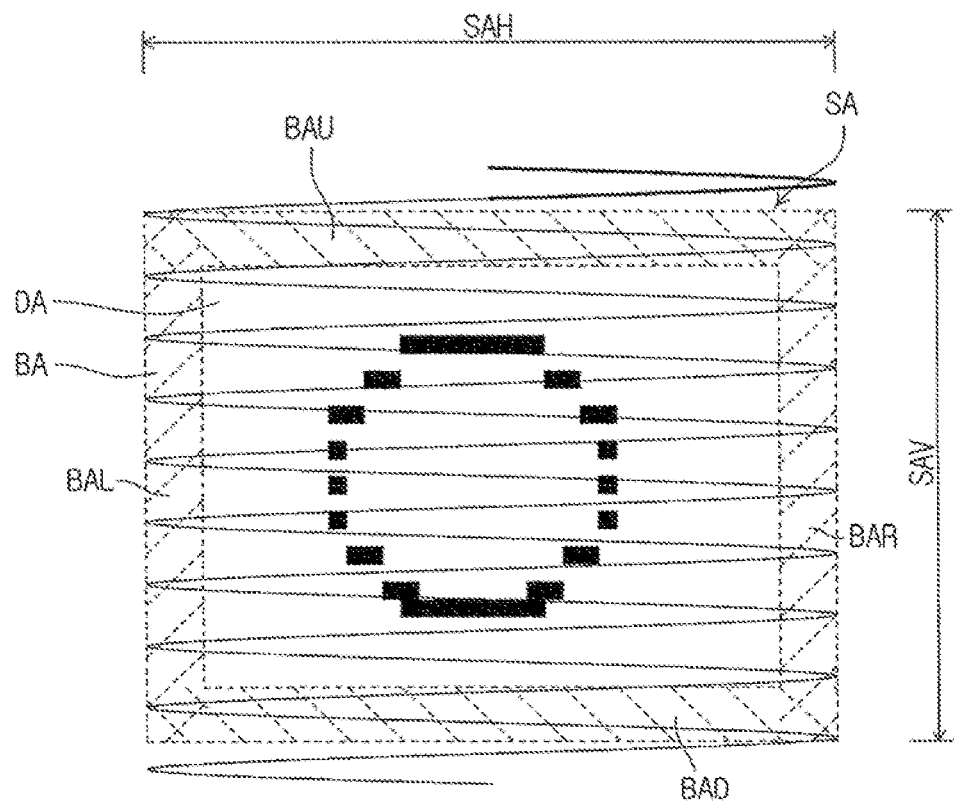
FIG. 9 is a diagram schematically showing a locus of scanning (first embodiment)

Next, the characteristic detection controller 8 instructs the laser light source controller 6 to generate the laser drive data used in the characteristic detection frame period FIL (S115). Specifically, the laser light source controller 6 generates laser drive data for the characteristic detection frame period FIL on the basis of the ratio between the amplitude VA for vertical scanning in the normal frame period FD and the amplitude VAIL for vertical scanning in the characteristic detection frame period FIL. FIG. 8 shows an example of the laser drive data for the characteristic detection frame period FIL. When the amplitude VAIL is set to be 1.2 times the amplitude VA, the laser light source controller 6 generates the laser drive data for the characteristic detection frame period FIL by reducing the image shown in FIGS. 2 to 83% in the vertical direction. As a result, as shown in FIG. 9, the size of the drawing image to be drawn in the characteristic detection frame period FIL is equal to the size of the drawing image (see FIG. 5) to be drawn in the normal frame period FD, which gives a less feeling of strangeness to the user.

Next, the characteristic detection controller 8 instructs the laser light source controller 6 to output the characteristic detection laser light from the laser module 10 in the characteristic detection frame period FIL (S120). FIG. 7 shows a timing when the characteristic detection laser light is output. The characteristic detection laser light is output from the red, blue, and green laser diodes 101 in each characteristic detection frame, and the photodiode 14 measures the amount of output light from each laser diode 101. In FIG. 9, a region in which the characteristic detection laser light is projected is indicated by a thick line so as to overlap the locus of scanning. As shown in FIGS. 7 and 9, the laser light source controller 6 controls the output of each laser diode 101 so as to output the characteristic detection laser light from the laser module 10 during a time when the scanner 12 scans the outside of the scanning region SA (hereinafter referred to simply as the scanning region SA) in the normal frame period FD. The masking shield 9 shown in FIG. 1 is disposed at a position where the characteristic detection laser light output from the laser module 10 is blocked when the scanner 12 is scanning the outside of the scanning region SA. According to the above-mentioned processing, the position where the characteristic detection laser light is projected can be further spaced apart from the drawing image position in the vertical direction, without substantially changing the shape of the drawing image. Therefore, it is possible to reduce the possibility that stray light generated due to a diffuse reflection of the characteristic detection laser light blocked by the masking shield 9 will be displayed in the drawing image region DA, thereby suppressing degradation in the quality of the drawing image.

Next, the characteristic detection controller 8 controls the laser light source controller 6 to acquire the measurement result from the photodiode 14 which has measured the amount of the characteristic detection laser light (S130), detect the actual output value of each laser diode 101 on the basis of the acquired measurement result (S140), and cause each laser diode 101 to output an appropriate amount of light based on the detection result.

The first embodiment described above can be modified as follows.

For example, the characteristic detection laser light can be output at any timing, as long as the timing is within a period in which the scanner 12 is scanning the outside of the scanning region SA. For example, the timing may be within the vertical return scan period P4, the upper blanking region scan period P1, the image drawing region scan period P2, or the lower blanking region scan period P3.

(Second Embodiment)

Next, a second embodiment will be described. Differences between the second embodiment and the first embodiment will be mainly described below, while explanations which have already been given above will not be repeated.

Figure 10:
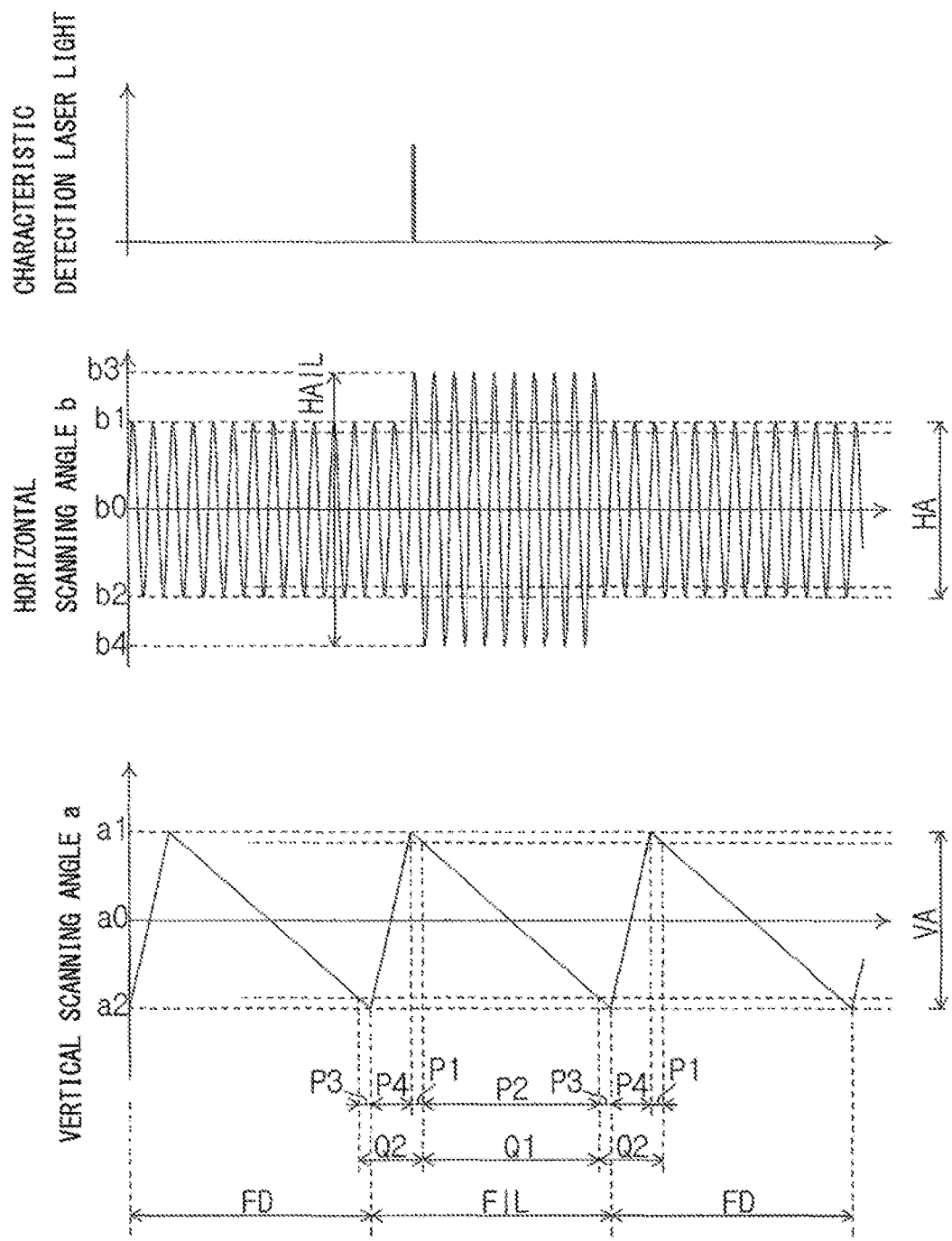
FIG. 10 is a graph schematically showing time variations of the vertical scan angle and the horizontal scan angle (second embodiment)
Figure 12:
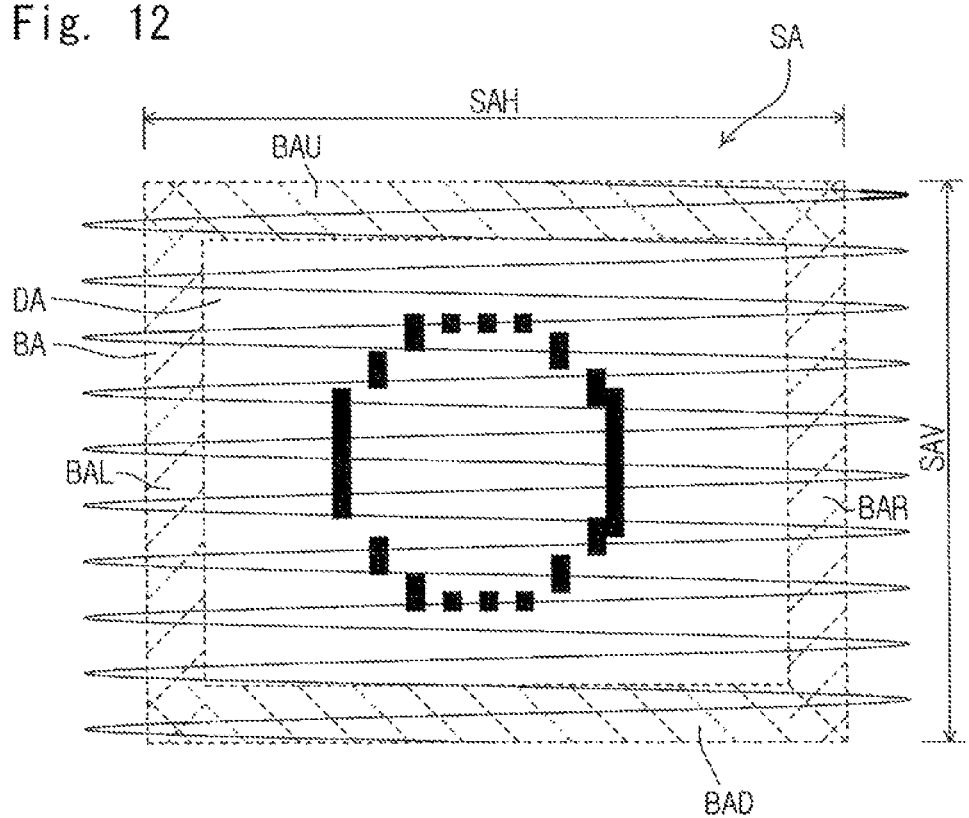
FIG. 12 is a diagram schematically showing a locus of scanning (second embodiment)

In the first embodiment described above, the characteristic detection controller 8 extends the amplitude for vertical scanning in the characteristic detection frame period FIL. On the other hand, in this embodiment, as shown in FIGS. 10 and 12, the amplitude for horizontal scanning is extended in the characteristic detection frame period FIL.

Specifically, the characteristic detection controller 8 first determines whether the next frame period F is the characteristic detection frame period FIL (S100). When it is determined that the next frame period F is not the characteristic detection frame period FIL (S100: NO), the next frame period F is the normal frame period FD, and thus the characteristic detection controller 8 repeats the above-mentioned determination. When it is determined that the next frame period F is the characteristic detection frame period FIL (S100: YES), as shown in FIG. 10, the characteristic detection controller 8 instructs the scanner controller 7 to cause the scanner 12 to perform scanning with an extended amplitude in the characteristic detection frame period FIL (S110). As shown in FIG. 10, the scanner controller 7 extends the amplitude for horizontal scanning in the characteristic detection frame period FIL so that an amplitude HAIL for horizontal scanning in the characteristic detection frame period FIL becomes larger than the amplitude HA for horizontal scanning in the normal frame period FD, while the scanner controller 7 performs vertical scanning in the characteristic detection frame period FIL in the same manner as vertical scanning in the normal frame period FD.

Figure 11:
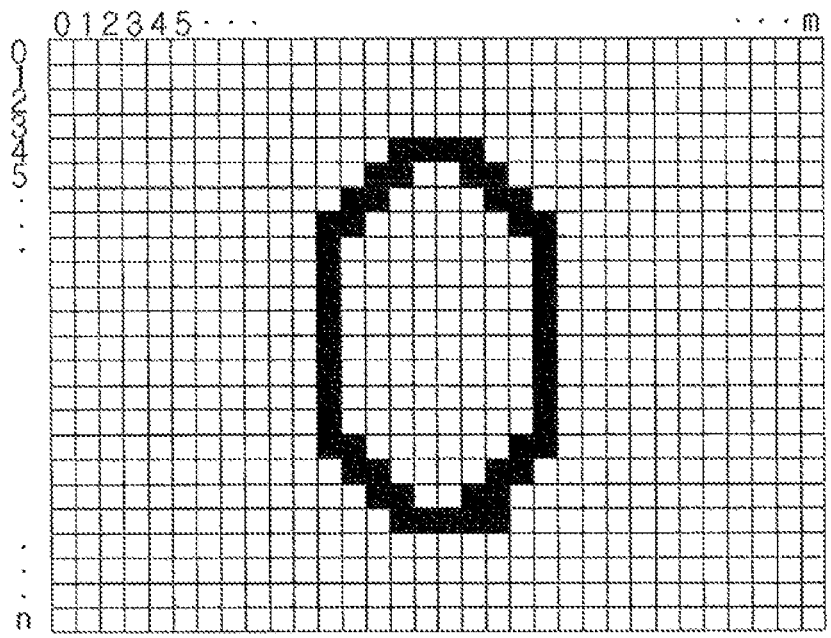
FIG. 11 is a diagram schematically showing an example of laser drive data (second embodiment)

Next, the characteristic detection controller 8 instructs the laser light source controller 6 to generate the laser drive data used in the characteristic detection frame period FIL (S115). Specifically, the laser light source controller 6 generates the laser drive data for the characteristic detection frame period FIL on the basis of the ratio between the amplitude HA for horizontal scanning in the normal frame period FD and the amplitude HAIL for horizontal scanning in the characteristic detection frame period FIL. FIG. 11 shows the laser drive data for the characteristic detection frame period FIL. When the amplitude HAIL is set to be 1.2 times the amplitude HA, the laser light source controller 6 generates the laser drive data for the characteristic detection frame period FIL by reducing the image shown in FIGS. 2 to 83% in the horizontal direction. Thus, as shown in FIG. 12, the size of the drawing image to be drawn in the characteristic detection frame period FIL is equal to the size of the drawing image (see FIG. 5) to be drawn in the normal frame period FD, so that the user is less likely to have a feeling of strangeness.

Next, the characteristic detection controller 8 instructs the laser light source controller 6 to output the characteristic detection laser light from the laser module 10 in the characteristic detection frame period FIL (S120). FIG. 10 shows a timing when the characteristic detection laser light is output. The characteristic detection laser light is output from the red, blue, and green laser diodes 101 in each characteristic detection frame, and the photodiode 14 measures the amount of output light from each laser diode 101. In FIG. 12, a region in which the characteristic detection laser light is projected is indicated by a thick line so as to overlap the locus of scanning. As shown in FIGS. 10 and 12, the laser light source controller 6 controls the output of each laser diode 101 so that the characteristic detection laser light is output from the laser module 10 when the scanner 12 is scanning the outside of the scanning region SA. The masking shield 9 shown in FIG. 1 is disposed at a position where the characteristic detection laser light output from the laser module 10 is blocked when the scanner 12 is scanning the outside of the scanning region SA. According to the processing described above, the position where the characteristic detection laser light is projected can be further spaced apart from the drawing image position in the horizontal direction, without substantially changing the shape of the drawing image. Therefore, it is possible to reduce the possibility that stray light generated due to a diffuse reflection of the characteristic detection laser light blocked by the masking shield 9 will be displayed in the drawing image region, thereby suppressing degradation in the quality of the drawing image.

Next, the characteristic detection controller 8 controls the laser light source controller 6 to acquire the measurement result from the photodiode 14 which has measured the amount of the characteristic detection laser light (S130), detect the actual output value of each laser diode 101 on the basis of the acquired measurement result (S140), and cause each laser diode 101 to output an appropriate amount of light based on the detection result.

The second embodiment described above can be modified as follows.

For example, the characteristic detection laser light may be output at any timing, as long as the timing is within a period in which the scanner 12 is scanning the outside of the scanning region SA. For example, the timing may be within the vertical return scan period P4, the upper blanking region scan period P1, the image drawing region scan period P2, or the lower blanking region scan period P3.

The first and second embodiments described above have the following features.

The image drawing device 1 includes: the laser light source unit 3 which outputs laser light; the scanner 4 which scans the laser light output from the laser light source unit 3 by reflecting the laser light; the laser light source controller 6 which controls a laser light output timing of the laser light source unit 3 and an output value of the laser light so that a drawing image based on input image data is generated by scanning of the scanner 4 in a scanning region scanned by the scanner 4, and controls the laser light source unit 3 to output characteristic detection laser light for detecting the output value of the laser light output from the laser light source unit 3; the scanner controller 7 which controls scanning of the scanner 4 so that the scanner 4 scans the laser light with the predetermined amplitude VA (or the amplitude HA); and the characteristic detection controller 8 which controls, when the output value of the laser light output from the laser light source unit 3 is adjusted, the scanner controller 7 so that the amplitude for vertical scanning (or horizontal scanning) of the scanner 4 exceeds a scanning range corresponding to the predetermined amplitude (VA or HA), and controls the laser light source controller 6 so that the characteristic detection laser light is output during scanning in a range beyond the scanning range, which is outside of the region in which the drawing image is generated and corresponds to the predetermined amplitude (VA or HA), thereby adjusting the output value of the laser light on the basis of the detection result of the output value of the characteristic detection laser light. With the configuration described above, it is possible to suppress degradation in the drawing quality of the drawing image due to irradiation of the characteristic detection laser light output during APC processing.

When the output value of the laser light output from the laser light source unit 3 is adjusted, the characteristic detection controller 8 controls the scanner controller 7 to perform scanning with an amplitude extended from the predetermined amplitude so that the scanner 4 performs scanning in a range beyond the scanning range corresponding to the predetermined amplitude.

In the image drawing method for generating a drawing image by causing the scanner 4, which scans laser light output from the laser light source unit 3 with a predetermined amplitude, to reflect the laser light, when the output value of the laser light output from the laser light source unit 3 is adjusted, the scanner 4 performs scanning in a range beyond the scanning range corresponding to the predetermined amplitude. The characteristic detection laser light for detecting the output value of the laser light is output during scanning in a range which is outside of the range in which the drawing image is generated and exceeds the scanning range corresponding to the predetermined amplitude, and the output value of the laser light is adjusted based on the detection result of the output value of the characteristic detection laser light. According to the above method, it is possible to suppress degradation in the drawing quality of the drawing image due to irradiation of the characteristic detection laser light output during APC processing.

(1) The image drawing device 1 includes: the laser light source unit 3 which outputs laser light; the scanning unit 4 which scans the laser light output from the laser light source unit 3 by reflecting the laser light; the laser light source controller 6 which controls a laser light output timing of the laser light source unit 3 and an output value of the laser light so that a drawing image based on input image data is generated by scanning of the scanner 4 in a scanning region scanned by the scanner 4, and controls the laser light source unit 3 to output the characteristic detection laser light for detecting the output value of the laser light output from the laser light source unit 3; the scanner controller 7 which controls scanning of the scanner 4 so that the scanner 4 scans the laser light with the predetermined amplitude VA (or the amplitude HA); and the characteristic detection controller 8 which controls the scanner controller 7 to perform scanning in such a manner that the amplitude for vertical scanning (or horizontal scanning) of the scanner 4 is extended from the predetermined amplitude (VA or HA) when the output value of the laser light output from the laser light source unit 3 is adjusted, and controls the laser light source controller 6 to output the characteristic detection laser light to the outside of the region in which the drawing image is generated, thereby adjusting the output value of the laser light on the basis of the detection result of the output value of the laser light of the characteristic detection laser light. With the configuration described above, it is possible to suppress degradation in the drawing quality of the drawing image due to irradiation of the characteristic detection laser light output during APC processing.

(2) The characteristic detection control 8 controls the laser light source controller 6 so that the drawing image has a constant size, on the basis of the ratio of the predetermined amplitude to the extended amplitude, when the scanner 4 is scanned with the extended amplitude.

Each of the embodiments described above can be modified, for example, as follows.

The drawing data for the characteristic detection frame period FIL may indicate a single hue corresponding to an average hue of the input image data, and a single luminance corresponding to an average luminance of the input image data.

The reason why the image having a single hue corresponding to an average hue of the input image data and a single luminance corresponding to an average luminance of the input image data is inserted in the characteristic detection frame period FIL is that even when drawing images are drawn to have a constant size based on the ratio of the predetermined amplitude to the extended amplitude, these drawing images are not identical images. If the drawing images are inserted into one frame among a plurality of continuous frames, the user may have a feeling of strangeness.

The characteristic detection controller 8 generates an image having a single hue corresponding to an average hue of the input image data and a single luminance corresponding to an average luminance of the input image data on the basis of the input image data. The characteristic detection controller 8 calculates the average hue and the average luminance from color information and luminance information on all pixels of the drawing image constituting one frame, for the drawing data in a frame period immediately before the characteristic detection frame period FIL, and generates the drawing image having the calculated average hue and average luminance.

Through such processing, a feeling of strangeness generated before and after the APC processing performed by the characteristic detection controller 8 can be suppressed by a simple control.

(Third Embodiment)

Next, a third embodiment will be described with reference to FIGS. 13 to 16. Differences between the third embodiment and the first embodiment will be mainly described below, while explanations which have already been given above will not be repeated.

In the first embodiment described above, the characteristic detection controller 8 extends the amplitude for vertical scanning in the characteristic detection frame period FIL. On the other hand, in this embodiment, when the APC processing is performed, the characteristic detection controller 8 controls the scanner controller 7 to perform scanning in such a manner that the scanning center of the scanner 12 is shifted from a predetermined scanning center. The predetermined scanning center is a0 when the vertical mirror 12a is used, and the predetermined scanning center is b0 when the horizontal mirror 12b is used. It is appropriate for the characteristic detection processing unit 8 to execute APC processing in a period corresponding to one frame of the drawing image. Further, the APC processing is performed, the characteristic detection controller 8 controls the laser light source controller 6 to output the characteristic detection laser light to the outside of the region in which the drawing image is generated.

For convenience of explanation, the frame period F in which the APC processing is performed by the characteristic detection controller 8 among the plurality of frame periods F is particularly referred to as the characteristic detection frame period FIL, and the frame periods F other than the characteristic detection frame period FIL are referred to as the normal frame period FD.

The APC processing performed by the characteristic detection controller 8 in the operation of the image drawing device 1 will be described in detail below.

Figure 13:
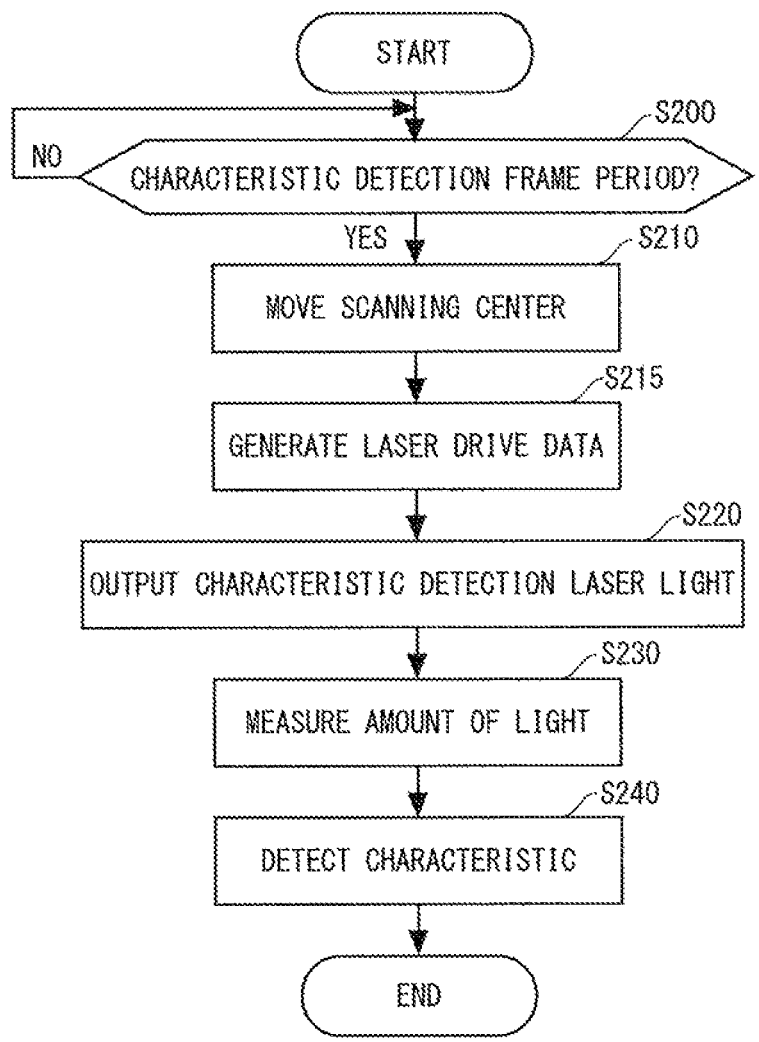
FIG. 13 is a flowchart showing a control example of an image display device (third embodiment)
Figure 14:
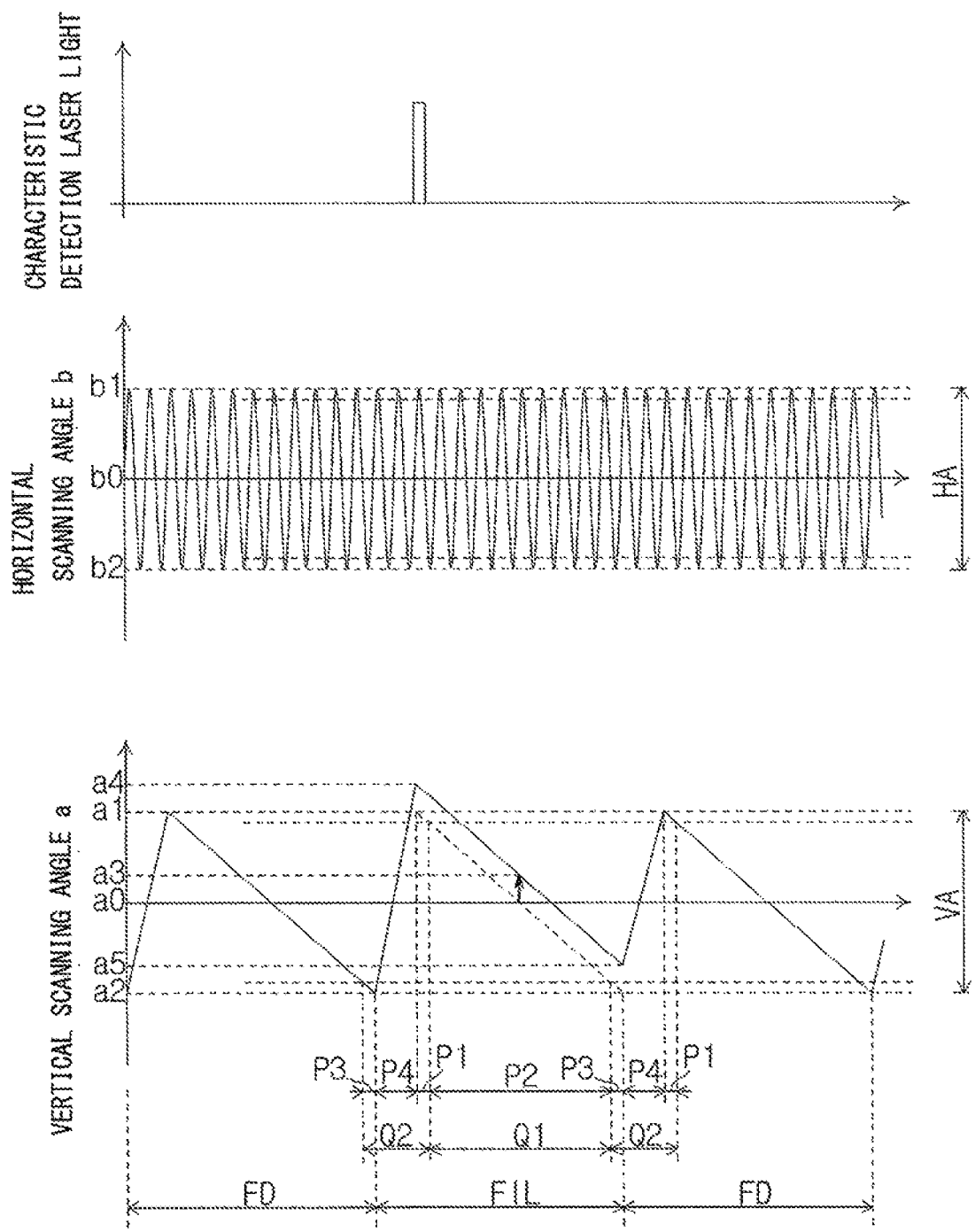
FIG. 14 is a graph schematically showing time variations of the vertical scan angle and the horizontal scan angle (third embodiment)

FIG. 13 shows a control flow of the image drawing device 1. FIG. 14 is a graph showing time variations of the vertical scan angle and the horizontal scan angle. Assume herein that, as shown in FIG. 14, the first and third frame periods F which appear on the temporal axis are the normal frame period FD and the second frame period F is the characteristic detection frame period FIL.

The characteristic detection controller 8 first determines whether the next frame period F is the characteristic detection frame period FIL (S200). When it is determined that the next frame period F is not the characteristic detection frame period FIL (S200: NO), the next frame period F is the normal frame period FD, and thus the characteristic detection controller 8 repeats the above-mentioned determination. When it is determined that the next frame period F is the characteristic detection frame period FIL (S200: YES), as shown in FIG. 14, the characteristic detection controller 8 instructs the scanner controller 7 to cause the scanner 12 to perform scanning at a moved scanning center in the characteristic detection frame period FIL (S210). In this embodiment, the scanner controller 7 moves the scanning center for vertical scanning in the characteristic detection frame period FIL. As shown in FIG. 14, the scanner controller 7 moves the scanning center for vertical scanning in the characteristic detection frame period FIL in such a manner that a vertical scan angle center a3 (second scanning center) for vertical scanning in the characteristic detection frame period FIL is above the vertical scan angle center a0 (first scanning center) for vertical scanning in the normal frame period FD. Specifically, an upper return scan angle a4 for vertical scanning in the characteristic detection frame period FIL is set to be larger than the upper return scan angle a1 for vertical scanning in the normal frame period FD, and a lower return scan angle a5 for vertical scanning at the end of the characteristic detection frame period FIL is set to be larger than the lower return scan angle a2 for vertical scanning in the normal frame period FD. The scanner controller 7 maintains the amplitude for vertical scanning in the characteristic detection frame period FIL at the amplitude VA for vertical scanning in the normal frame period FD. The scanner controller 7 performs horizontal scanning in the characteristic detection frame period FIL in the same manner as horizontal scanning in the normal frame period FD.

Figure 15:
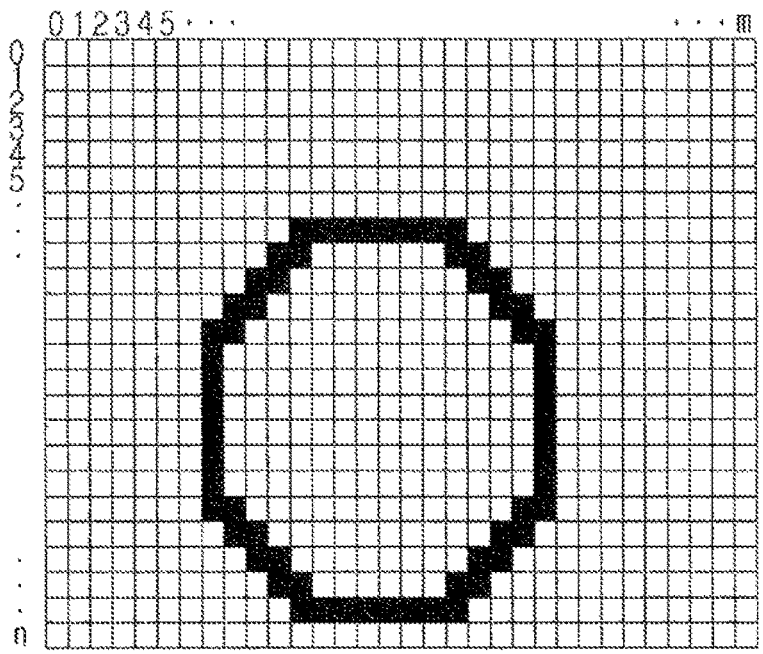
FIG. 15 is a diagram schematically showing an example of laser drive data (third embodiment)
Figure 16:
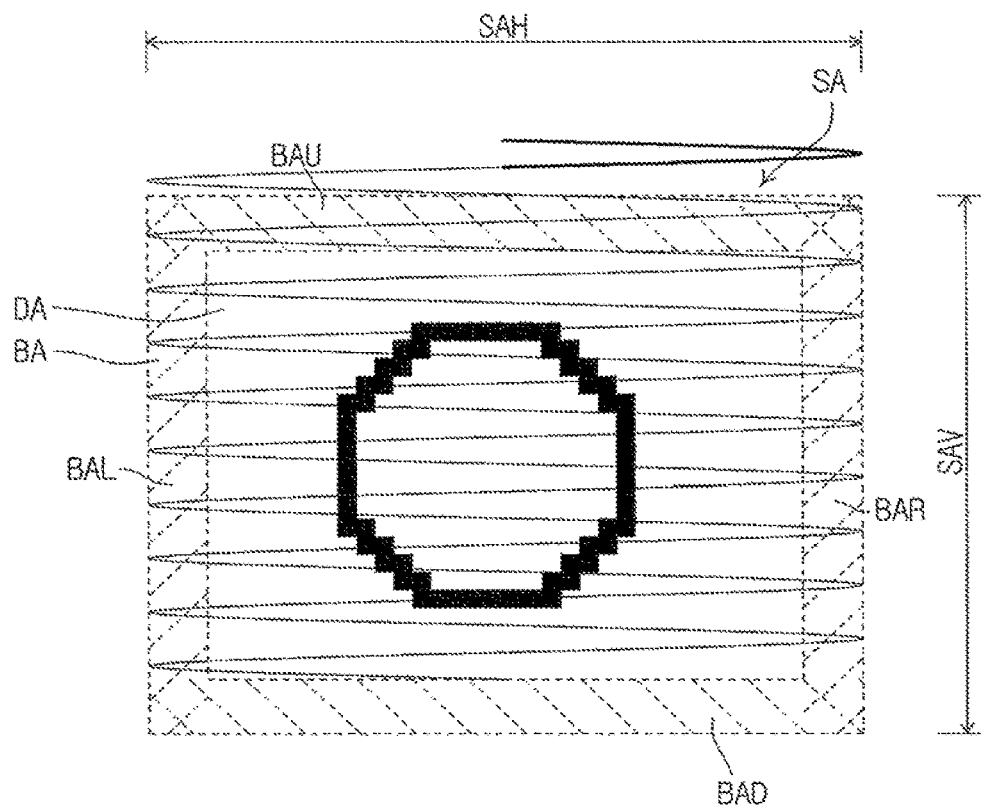
FIG. 16 is a diagram schematically showing a locus of scanning (third embodiment)

Next, the characteristic detection controller 8 instructs the laser light source controller 6 to generate the laser drive data used in the characteristic detection frame period FIL (S215). Specifically, the laser light source controller 6 generates the laser drive data for the characteristic detection frame period FIL on the basis of the difference between the vertical scan angle center a0 for vertical scanning in the normal frame period FD and the vertical scan angle center a3 for vertical scanning in the characteristic detection frame period FIL. FIG. 15 shows the laser driver data for the characteristic detection frame period FIL. The laser light source controller 6 generates the laser drive data for the characteristic detection frame period FIL by moving the image shown in FIG. 2 downward by the amount corresponding to the above-mentioned difference in the vertical direction. As a result, as shown in FIG. 16, the position of the drawing image drawn in the characteristic detection frame period FIL matches the position of the drawing image (see FIG. 5) drawn in the normal frame period FD, so that the user is less likely to have a feeling of strangeness.

Next, the characteristic detection controller 8 instructs the laser light source controller 6 to output the characteristic detection laser light from the laser module 10 in the characteristic detection frame period FIL (S220). FIG. 14 shows a timing when the characteristic detection laser light is output. The characteristic detection laser light is output from the red, blue, and green laser diodes 101 in each characteristic detection frame, and the photodiode 14 measures the amount of output light from each laser diode 101. In FIG. 16, a region in which the characteristic detection laser light is projected is indicated by a thick line so as to overlap the locus of scanning. As shown in FIGS. 14 and 16, the laser light source controller 6 controls the output of each laser diode 101 so that the characteristic detection laser light is output from the laser module 10 when the scanner 12 is scanning the outside of the scanning region SA (hereinafter referred to simply as the scanning region SA) in the normal frame period FD. The masking shield 9 shown in FIG. 1 is disposed at a position where the characteristic detection laser light output from the laser module 10 is blocked when the scanner 12 is scanning the outside of the scanning region SA. According to the above processing, the position where the characteristic detection laser light is projected can be further spaced apart from the drawing image position in the vertical direction, without substantially changing the drawing image position. Accordingly, it is possible to reduce the possibility that stray light generated due to a diffuse reflection of the characteristic detection laser light blocked by the masking shield 9 will be displayed in the drawing image region, thereby suppressing degradation in the quality of the drawing image.

Next, the characteristic detection controller 8 acquires the measurement result from the photodiode 14 which has measured the amount of the characteristic detection laser light (S230), detects the actual output value of each laser diode 101 on the basis of the acquired measurement result (S240), and controls the laser light source controller 6 so that each laser diode 101 outputs an appropriate amount of light based on the detection result.

The third embodiment described above can be modified as follows.

In the third embodiment described above, as shown in FIGS. 14 and 16, in the characteristic detection frame period FIL, the scanner 12 scans a region shifted upward from the scanning region SA. However, instead, in the characteristic detection frame period FIL, the scanner 12 may scan a region shifted downward from the scanning region SA. In any case, since the scanning center for vertical scanning is moved in the characteristic detection frame period FIL, the scanner 12 scans a region including an outside region of the scanning region SA, and the characteristic detection laser light is output from the laser diode 10 when the scanner 12 is scanning the outside of the scanning region SA.

Further, the characteristic detection laser light may be output at any timing, as long as the timing is within a period in which the scanner 12 is scanning the outside of the scanning region SA. For example, the timing may be within the vertical return scan period P4, the upper blanking region scan period P1, the image drawing region scan period P2, the lower blanking region scan period P3.

(Fourth Embodiment)

Figure 17:
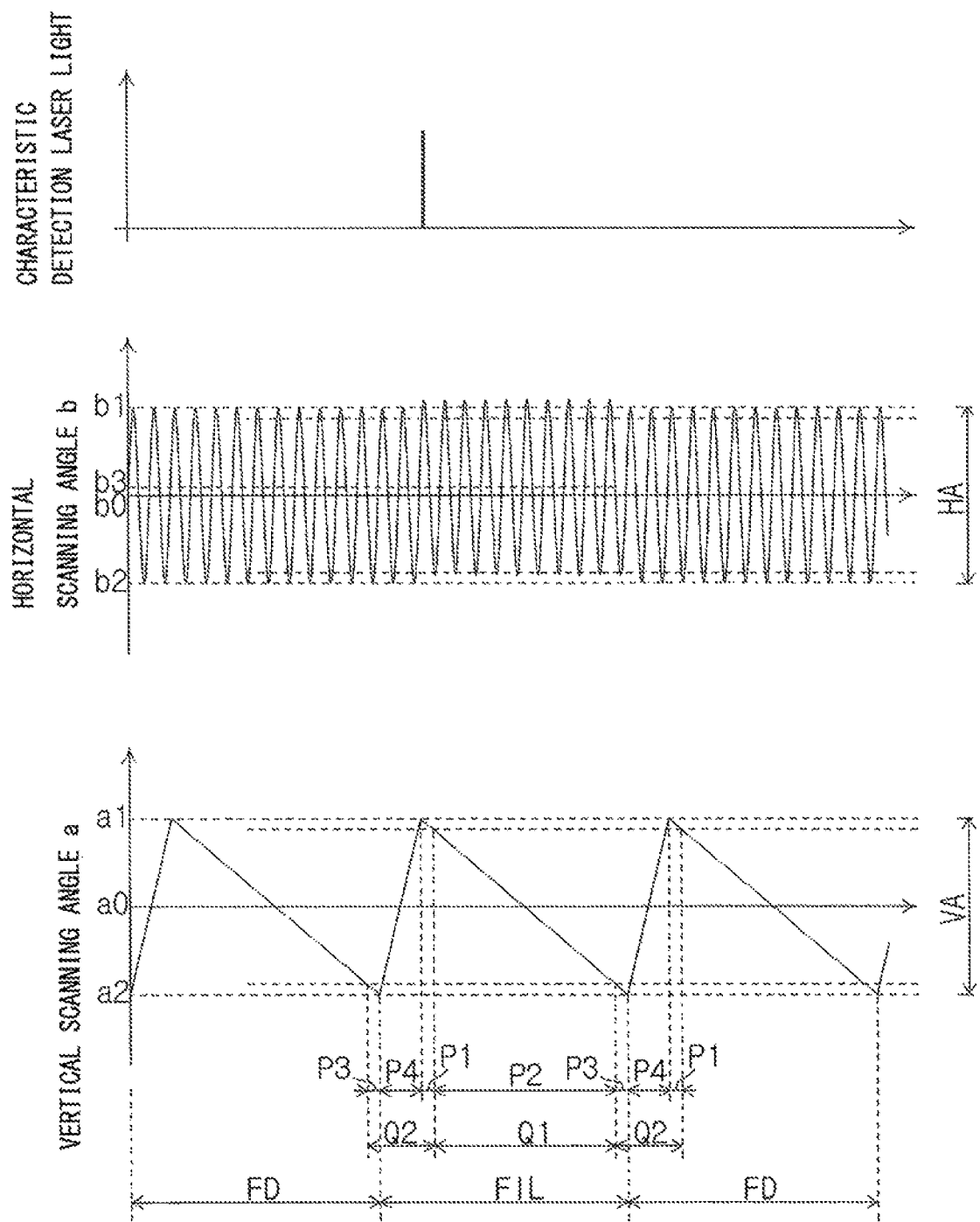
FIG. 17 is a graph schematically showing time variations of the vertical scan angle and the horizontal scan angle (fourth embodiment)
Figure 18:
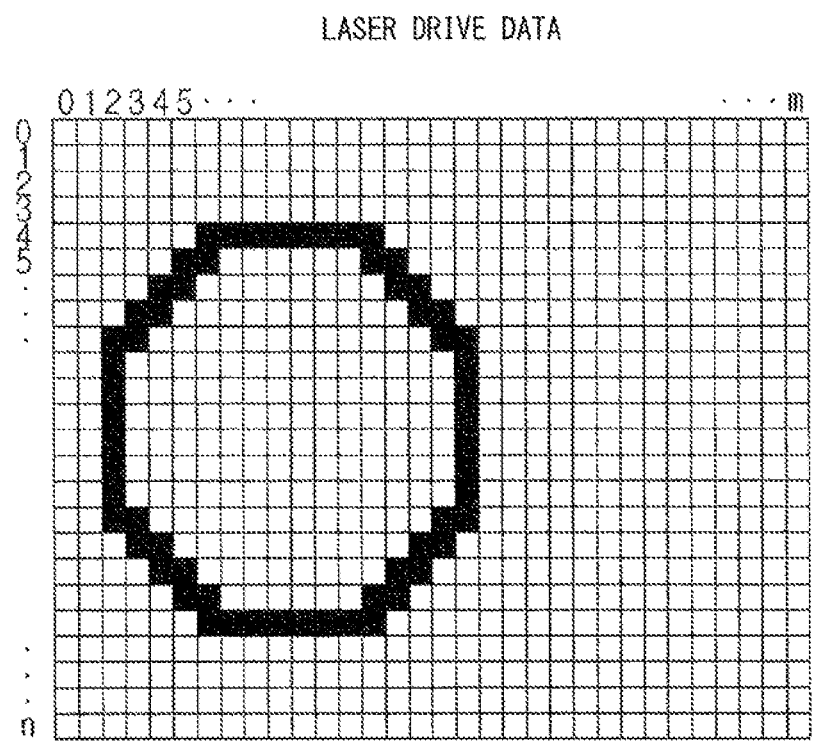
FIG. 18 is a diagram schematically showing an example of laser drive data (fourth embodiment)
Figure 19:
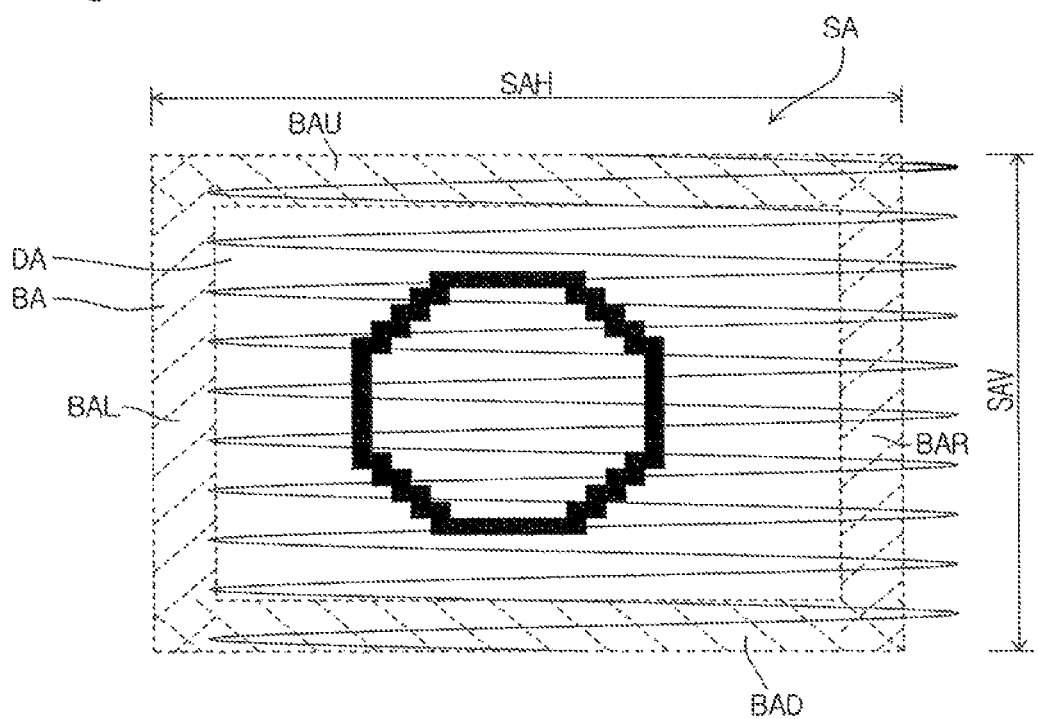
FIG. 19 is a diagram schematically showing a locus of scanning (fourth embodiment)

Next, a fourth embodiment will be described with reference to FIGS. 17 to 19. Differences between the fourth embodiment and the first embodiment will be mainly described, while explanations which have already been given above will not be repeated.

In the third embodiment, the characteristic detection controller 8 moves the scanning center for vertical scanning in the characteristic detection frame period FIL. On the other hand, in this embodiment, as shown in FIGS. 17 and 19, the scanning center for horizontal scanning is moved in the characteristic detection frame period FIL.

Specifically, the characteristic detection controller 8 first determines whether the next frame period F is the characteristic detection frame period FIL (S200). When it is determined that the next frame period F is not the characteristic detection frame period FIL (S200: NO), the next frame period F is the normal frame period FD, and thus the characteristic detection controller 8 repeats the above-mentioned determination. When it is determined that the next frame period F is the characteristic detection frame period FIL (S200: YES), as shown in FIG. 17, the characteristic detection controller 8 instructs the scanner controller 7 to cause the scanner 12 to perform scanning in the characteristic detection frame period FIL with the moved scanning center for horizontal scanning (S210). As shown in FIG. 17, the scanner controller 7 moves the scanning center for horizontal scanning in the characteristic detection frame period FIL in such a manner that a horizontal scan angle center b3 for horizontal scanning in the characteristic detection frame period FIL is shifted from the horizontal scan angle center b0 for horizontal scanning in the normal frame period FD. Specifically, the horizontal scan angle center b3 for horizontal scanning in the characteristic detection frame period FIL is set to be larger than the horizontal scan angle center b0 for horizontal scanning in the normal frame period FD. The amplitude for horizontal scanning in the characteristic detection frame period FIL is maintained at the amplitude HA for horizontal scanning in the normal frame period FD. Further, the scanner controller 7 performs vertical scanning in the characteristic detection frame period FIL in the same manner as vertical scanning in the normal frame period FD.

Next, the characteristic detection controller 8 instructs the laser light source controller 6 to generate the laser drive data used in the characteristic detection frame period FIL (S215). Specifically, the laser light source controller 6 generates the laser drive data used in the characteristic detection frame period FIL on the basis of the difference between the horizontal scan angle center b0 of horizontal scanning in the normal frame period FD and the horizontal scan angle center b3 of horizontal scanning in the characteristic detection frame period FIL. FIG. 18 shows laser drive data for the characteristic detection frame period FIL. The laser light source controller 6 moves the image shown in FIG. 2 in the horizontal direction by the amount corresponding to the above-mentioned difference, thereby generating the laser drive data for the characteristic detection frame period FIL. As a result, as shown in FIG. 19, the position of the drawing image drawn in the characteristic detection frame period FIL matches the position of the drawing image (see FIG. 5) drawn in the normal frame period FD, so that the user is less likely to have a feeling of strangeness.

Next, the characteristic detection controller 8 instructs the laser light source controller 6 to output the characteristic detection laser light from the laser module 10 in the characteristic detection frame period FIL (S220). FIG. 17 shows a timing when the characteristic detection laser light is output. The characteristic detection laser light is output from the red, blue, and green laser diodes 101 in each characteristic detection frame, and the photodiode 14 measures the amount of output light from the laser diodes 101. In FIG. 19, a region in which the characteristic detection laser light is projected is indicated by a thick line so as to overlap the locus of scanning. As shown in FIGS. 17 and 19, the laser light source controller 6 controls the output of each laser diode 101 so that the laser module 10 outputs the characteristic detection laser light when the scanner 12 is scanning the outside of the scanning region SA. The masking shield 9 shown in FIG. 1 is disposed at a position where the characteristic detection laser light output from the laser module 10 is blocked when the scanner 12 is scanning the outside of the scanning region SA. According to the above processing, the position where the characteristic detection laser light is projected can be further spaced apart from the drawing image position in the horizontal direction, without substantially changing the shape of the drawing image. Therefore, it is possible to reduce the possibility that stray light generated due to a diffuse reflection of the characteristic detection laser light blocked by the masking shield 9 will be displayed in the drawing image region, thereby suppressing degradation in the quality of the drawing image.

Next, the characteristic detection controller 8 controls the laser light source controller 6 to acquire the measurement result from the photodiode 14 which has measured the amount of the characteristic detection laser light (S230), detect the actual output value of each laser diode 101 on the basis of the acquired measurement result (S240), and cause each laser diode 101 to output an appropriate amount of light based on the detection result.

The fourth embodiment described above can be modified as follows.

For example, the characteristic detection laser light may be output at any timing, as long as the timing is within a period in which the scanner 12 is scanning the outside of the scanning region SA. For example, the timing may be within the vertical return scan period P4, the upper blanking region scan period P1, the image drawing region scan period P2, the lower blanking region scan period P3.

The third and fourth embodiments described above have the following features.

The scanner controller 7 controls scanning of the scanner 4 so that the scanner 4 scans the laser light with the predetermined scanning center as a scanning center. When the output value of the laser light output from the laser light source unit 3 is adjusted, the characteristic detection controller 8 controls the scanner controller 7 to perform scanning in a range beyond the scanning range corresponding to the predetermined amplitude by moving the scanning center of the scanner 4 from the predetermined scanning center.

(1) The image display device 1 includes the laser light source unit 3 which outputs laser light; the scanner 4 which scans the laser light output from the laser light source unit 3 by reflecting the laser light; the laser light source controller 6 which controls a laser light output timing of the laser light source unit 3 and an output value of the laser light so that a drawing image based on input image data is generated by scanning of the scanner 4 in a scanning region scanned by the scanner 4, and controls the laser light source unit 3 to output the characteristic detection laser light for detecting the output value of the laser light output from the laser light source unit 3; the scanner controller 7 which controls scanning of the scanner 4 so that the scanner 4 performs scanning with the vertical scan angle center a0 (or the horizontal scan angle center b0, the predetermined scanning center) as a scanning center; and the characteristic detection controller 8 which controls scanning of the scanner 4 so that the scanner 4 performs scanning in such a manner that the scanning center for vertical scanning (or horizontal scanning) is shifted from the vertical scan angle center a0 (or the horizontal scan angle center b0) when the output value of the laser light output from the laser light source unit 3 is adjusted, and controls the laser light source controller 6 to output the characteristic detection laser light to the outside of the region in which the drawing image is generated, thereby adjusting the output value of the laser light on the basis of the detection result of the output value of the characteristic detection laser light. With the configuration described above, it is possible to prevent degradation in the drawing quality of the drawing image due to irradiation of the characteristic detection laser light output during APC processing.

(2) Further, when the scanner 4 performs scanning with the scanning center shifted from the predetermined scanning center as a scanning center, the characteristic detection controller 8 controls the laser light source controller 6 so that the position of the drawing image drawn when scanning is performed with the predetermined scanning center as a scanning center matches the position of the drawing image drawn when scanning is performed with the scanning center shifted from the predetermined scanning center as a scanning center.

As described above, in the third and fourth embodiments, the characteristic detection controller 8 adjusts the laser light output vale in the period in which the scanning center of the scanner 4 is controlled to be shifted from the predetermined center. Thus, by limiting the period in which the scanning center of the scanner 4 is shifted, the effect of overshoot at the scanning return position on the linearity of the drawing image can be reduced as much as possible.

The embodiments described above can be modified, for example, as follows.

The drawing data for the I-L characteristic detection frame period FIL may indicate a single hue corresponding to an average hue of the input image data and a single luminance corresponding to an average luminance of the input image data.

The reason why the image having a single hue corresponding to an average hue of the input image data and a single luminance corresponding to an average luminance of the input image data is inserted in the characteristic detection frame period FIL is that even when drawing images are drawn so that the drawing images have a constant size on the basis of the ratio between the predetermined amplitude and the extended amplitude, the drawing images are not completely the same image. When such drawing images are inserted into one frame among a plurality of continuous frames, the user may have a feeling of strangeness.

The characteristic detection controller 8 generates an image having a single hue corresponding to an average hue of the input image data and a single luminance corresponding to an average luminance of the input image data on the basis of the input image data. The characteristic detection controller 8 calculates the average hue and the average luminance from color information and luminance information on all pixels of the drawing image constituting a frame, for the drawing data in a frame period immediately before the characteristic detection frame period FIL, and generates the drawing image having the calculated average hue and average luminance.

Through such processing, a feeling of strangeness generated before and after the APC processing performed by the characteristic detection controller 8 can be suppressed by a simple control.

(Fifth Embodiment)

Figure 21:
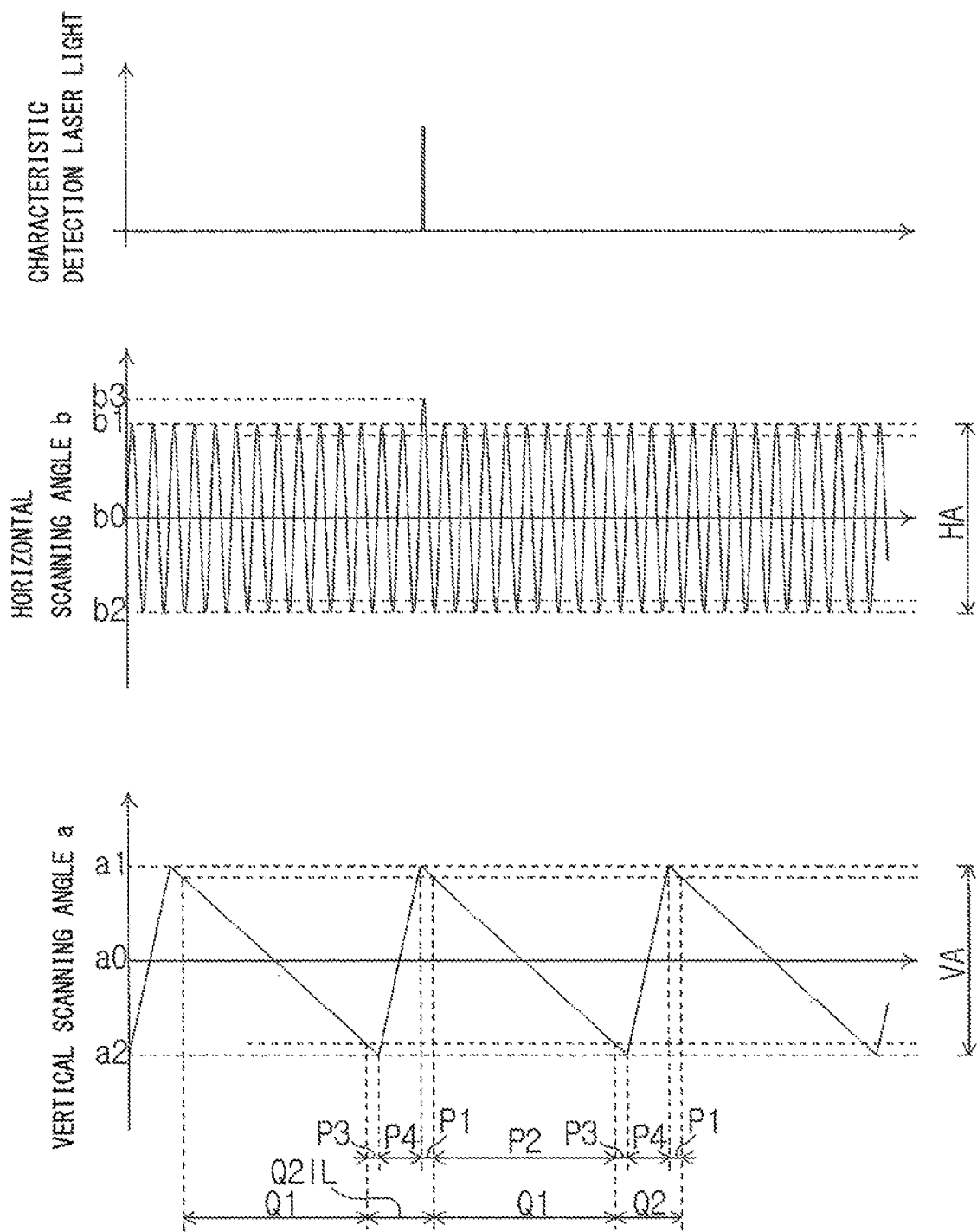
FIG. 21 is a graph schematically showing time variations of the vertical scan angle and the horizontal scan angle (fifth embodiment)
Figure 22:
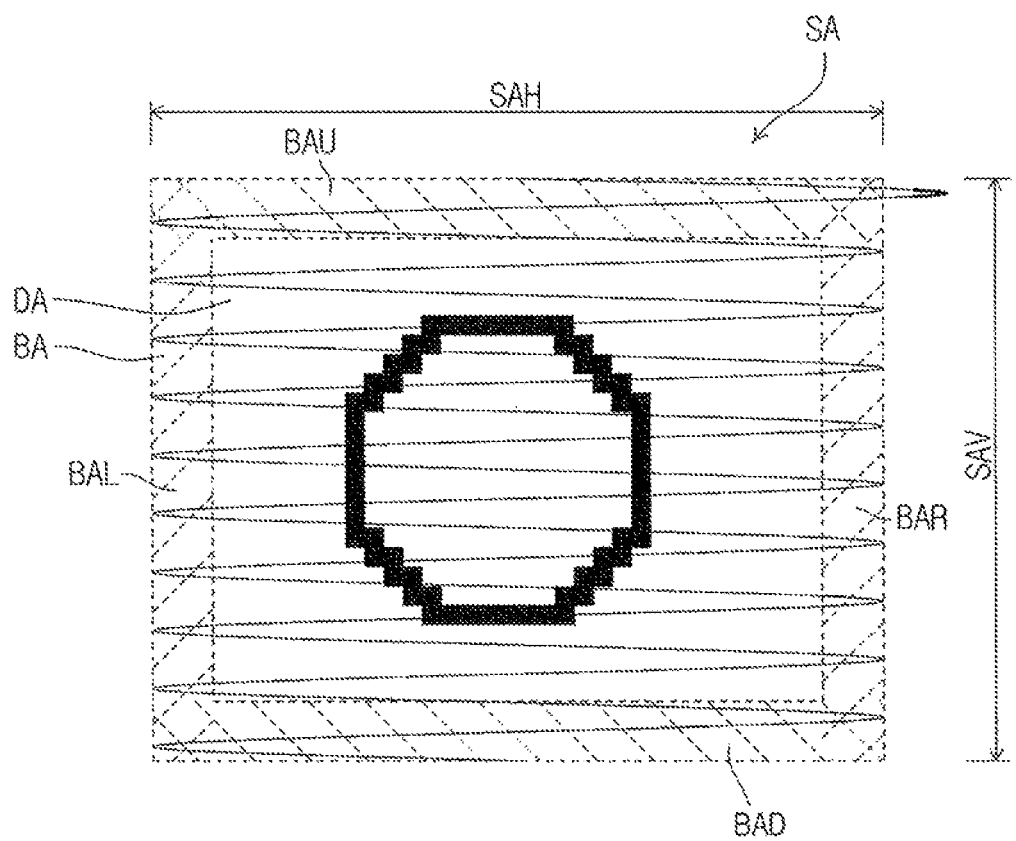
FIG. 22 is a diagram schematically showing a locus of scanning (fifth embodiment)

Next, a fifth embodiment will be described with reference to FIGS. 20 to 22. Differences between the fifth embodiment and the first embodiment will be mainly described, while explanations which have already been given above will not be repeated.

In the first embodiment described above, the characteristic detection controller 8 extends the amplitude for vertical scanning in the characteristic detection frame period FIL. On the other hand, in this embodiment, when the APC processing is performed, the characteristic detection controller 8 controls the scanner controller 7 to perform scanning by temporarily moving the scanning center of the scanner 12 to the outside of the predetermined scanning region. The predetermined scanning region is the scanning region SA. It is appropriate for the characteristic detection processing unit 8 to execute the APC processing in the period corresponding to one frame of the drawing image. Further, when the APC processing is performed, the characteristic detection controller 8 controls the laser light source controller 6 to output the characteristic detection laser light during scanning of the outside of the predetermined scanning region.

Hereinafter, for convenience of explanation, the non-image-drawing period Q2 in which the APC processing is performed by the characteristic detection controller 8 in a plurality of non-image-drawing periods Q2 is particularly referred to as a characteristic detection non-image-drawing period Q2IL.

The APC processing performed by the characteristic detection controller 8 in the operation of the image drawing device 1 will be described in detail below.

Figure 20:
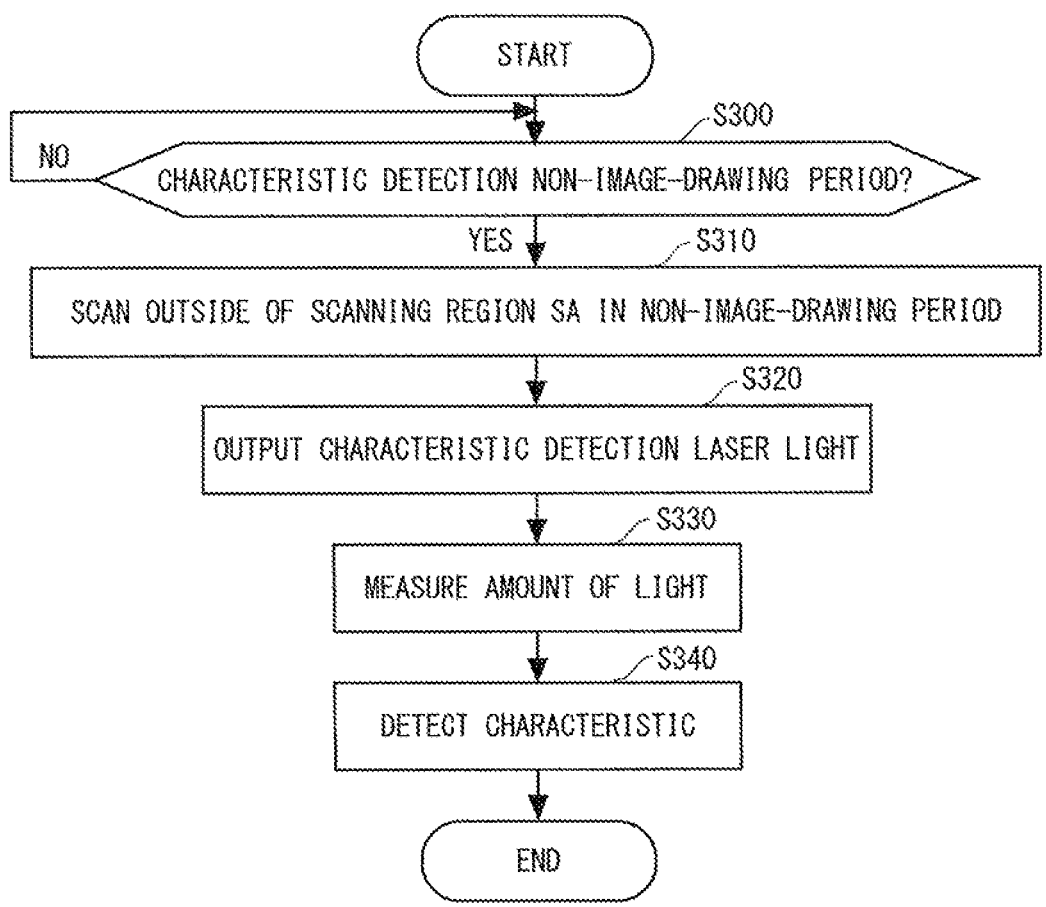
FIG. 20 is a flowchart showing a control example of an image drawing device (fifth embodiment)

FIG. 20 shows a control flow of the image drawing device 1. FIG. 21 is a graph showing time variations of the vertical scan angle and the horizontal scan angle. In this case, as shown in FIG. 21, the first non-image-drawing period Q2 appearing on the temporal axis is referred to as the characteristic detection non-image-drawing period Q2IL.

The characteristic detection controller 8 first determines whether the next non-image-drawing period Q2 is the characteristic detection non-image-drawing period Q2IL (S300). When it is determined that the next non-image-drawing period Q2 is not the characteristic detection non-image-drawing period Q2IL (S300: NO), the characteristic detection controller 8 repeats the above-mentioned determination. When it is determined that the next non-image-drawing period Q2 is the characteristic detection non-image-drawing period Q2IL (S300: YES), as shown in FIGS. 21 and 22, the characteristic detection controller 8 instructs the scanner controller 7 to cause the scanner 12 to scan the outside of the scanning region SA, which is the predetermined scanning region, in the characteristic detection non-image-drawing period Q2IL (S310). In this embodiment, the scanner controller 7 controls scanning of the scanner 12 so that the scanner 12 scans a region on the right side of the scanning region SA in the characteristic detection non-image-drawing period Q2IL. The right side of the scanning region SA is the right side of the upper blanking region BAU. Specifically, the right return scan angle b3 for horizontal scanning in the characteristic detection non-image-drawing period Q2IL is set to be larger than the right return scan angle b1 for horizontal scanning in the other non-image-drawing periods Q2, and the left return scan angle for horizontal scanning in the characteristic detection non-image-drawing period Q2IL is set to be equal to the left return scan angle b2 for horizontal scanning in the other non-image-drawing periods Q2. On the other hand, the scanner controller 7 performs vertical scanning in the characteristic detection non-image-drawing period Q2IL in the same manner as vertical scanning in the other non-image-drawing periods Q2.

Next, the characteristic detection controller 8 instructs the laser light source controller 6 to output the characteristic detection laser light from the laser module 10 in the characteristic detection non-image-drawing period Q2IL (S320). FIG. 21 shows a timing when the characteristic detection laser light is output. The characteristic detection laser light is output from the red, blue, and green laser diodes 101 in each characteristic detection non-image-drawing period, and the photodiode 14 measures the amount of output light from each laser diode 101. In FIG. 22, a region in which the characteristic detection laser light is projected is indicated by a thick line so as to overlap the locus of scanning. As shown in FIGS. 21 and 22, the laser light source controller 6 controls the output of each laser diode 101 so that the characteristic detection laser light is output from the laser module 10 when the scanner 12 is scanning the outside of the scanning region SA. Specifically, the laser light source controller 6 controls the output of each laser diode 101 so that the characteristic detection laser light is output from the laser module 10 when the scanner 12 is scanning the right side of the upper blanking region BAU. The masking shield 9 shown in FIG. 1 is disposed at a position where the characteristic detection laser light output from the laser diode 10 is blocked when the scanner 12 is scanning the outside of the scanning region SA. According to the above processing, the position where the characteristic detection laser light is projected can be spaced apart from the drawing image position, without changing the drawing image position and the drawing position. Therefore, it is possible to reduce the possibility that stray light generated due to a diffuse reflection of the characteristic detection laser light blocked by the masking shield 9 will be displayed in the drawing image region, thereby suppressing degradation in the quality of the drawing image.

Next, the characteristic detection controller 8 controls the laser light source controller 6 to acquire the measurement result from the photodiode 14 which has measured the amount of the characteristic detection laser light (S330), detect the actual output value of each laser diode 101 on the basis of the acquired measurement result (S340), and cause the laser diodes 101 output an appropriate amount of light based on the detection result.

The fifth embodiment described above can be modified as follows.

In the fifth embodiment described above, as shown in FIGS. 21 and 22, the scanner 12 scans a region outside of the predetermined scanning region on the right side of the upper blanking region BAU in the characteristic detection non-image-drawing period Q2IL. However, instead, in the characteristic detection non-image-drawing period Q2IL, the scanner 12 may scan a region outside of the predetermined scanning region on the left side of the upper blanking region BAU, or may scan a region outside the predetermined scanning region on the right side of the lower blanking region BAD. In any case, in the characteristic detection non-image-drawing period Q2IL, the scanner 12 scans the outside of the scanning region SA, and the characteristic detection laser light is output from the laser module 10 when the scanner 12 is scanning the outside of the scanning region SA.

The characteristic detection laser light may be output at any timing, as long as the timing is within the period in which the scanner 12 is scanning the outside of the scanning region SA. For example, the timing may be within the vertical return scan period P4, the upper blanking region scan period P1, or the lower blanking region scan period P3.

(Sixth Embodiment)

Figure 23:
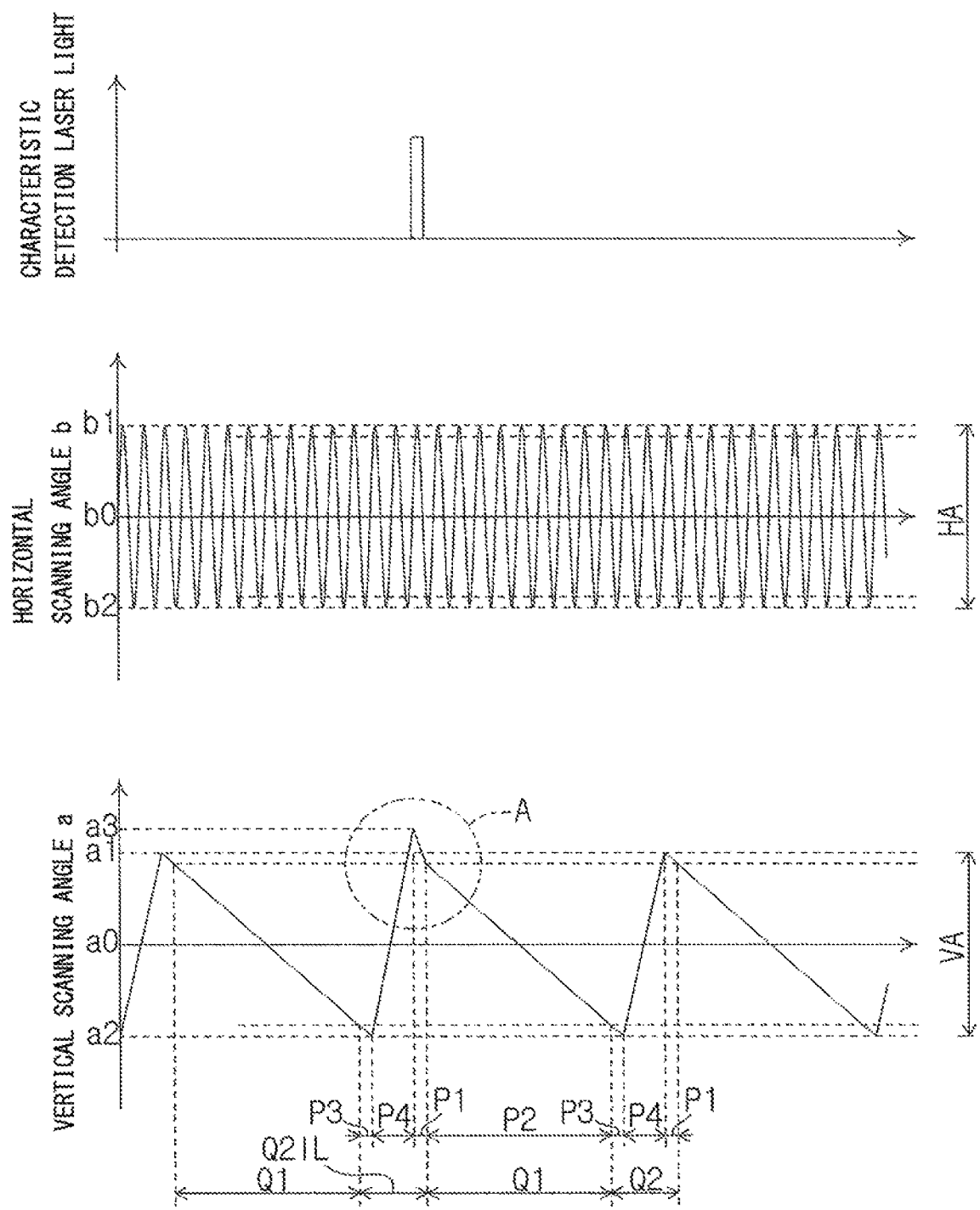
FIG. 23 is a graph schematically showing time variations of the vertical scan angle and the horizontal scan angle (sixth embodiment)
Figure 24:
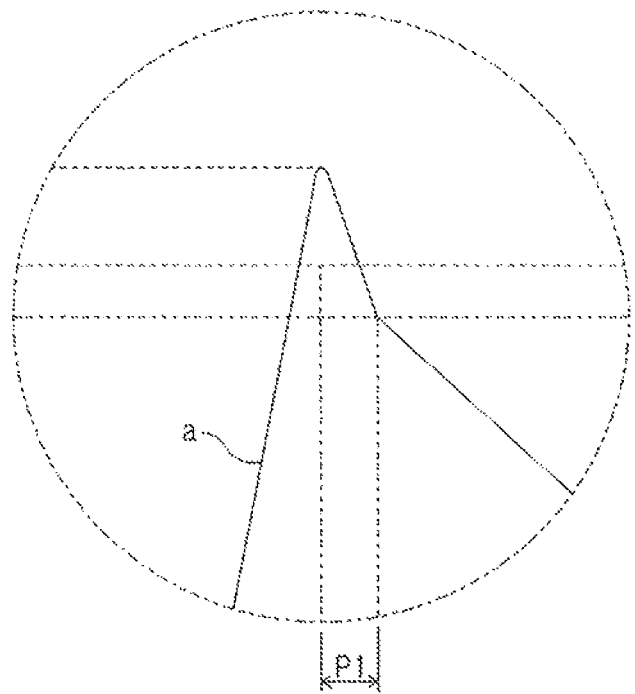
FIG. 24 is an extended view of a portion "A" shown in FIG. 23 (sixth embodiment)
Figure 25:
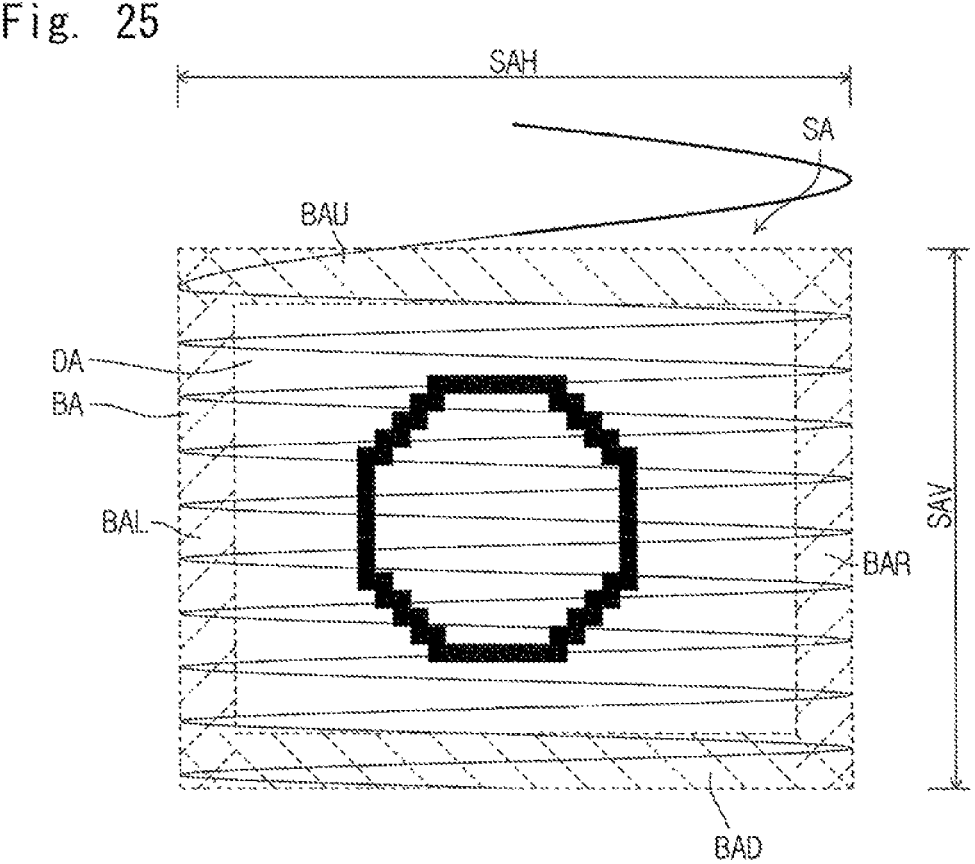
FIG. 25 is a diagram schematically showing a locus of scanning (sixth embodiment)

Next, a sixth embodiment will be described with reference to FIGS. 23 to 25. Differences between the sixth embodiment and the first embodiment will be mainly described below, while explanations which have already been given above will not be repeated.

In the fifth embodiment described above, the characteristic detection controller 8 causes the scanner 12 to scan a region on the right side of the scanning region SA in the characteristic detection non-image-drawing period Q2IL. On the other hand, in this embodiment, as shown in FIGS. 23 and 25, the scanner 12 scans a region on the upper side of the scanning region SA in the I-L characteristic detection non-image-drawing period Q2IL.

Specifically, the characteristic detection controller 8 first determines whether the next non-image-drawing period Q2 is the characteristic detection non-image-drawing period Q2IL (S300). When it is determined that the next non-image-drawing period Q2 is not the characteristic detection non-image-drawing period Q2IL (S300: NO), the characteristic detection controller 8 repeats the above-mentioned determination. When it is determined that the next non-image-drawing period Q2 is the characteristic detection non-image-drawing period Q2IL (S300: YES), as shown in FIGS. 23 and 25, the characteristic detection controller 8 instructs the scanner controller 7 to cause the scanner 12 to scan the outside of the scanning region SA, which is the predetermined scanning region, in the characteristic detection non-image-drawing period Q2IL (S310). In this embodiment, the scanner controller 7 controls scanning of the scanner 12 so that the scanner 12 scans the upper side of the scanning region SA in the characteristic detection non-image-drawing period Q2IL. Specifically, the upper return scan angle a3 for vertical scanning in the characteristic detection non-image-drawing period Q2IL is set to be larger than the upper return scan angle a1 for vertical scanning in the other non-image-drawing periods Q2, and the lower return scan angle for vertical scanning in the characteristic detection non-image-drawing period Q2IL is set to be equal to the lower return scan angle a2 for vertical scanning in the other non-image-drawing periods Q2. On the other hand, the scanner controller 7 performs horizontal scanning in the characteristic detection non-image-drawing period Q2IL in the same manner as horizontal scanning in the other non-image-drawing periods Q2. In this embodiment, as shown in FIG. 24, the vertical scan angle "a" is linearly changed in the upper blanking region scan period P1 of the characteristic detection non-image-drawing period Q2IL. Accordingly, as shown in FIG. 25, the locus of the scanning position of the scanner 12 is entirely elongated in the vertical direction in the region on the upper side of the image drawing region DA.

Next, the characteristic detection controller 8 instructs the laser light source controller 6 to output the characteristic detection laser light from the laser module 10 in the characteristic detection non-image-drawing period Q2IL (S320). FIG. 23 shows a timing when the characteristic detection laser light is output. The characteristic detection laser light is output from the red, blue, and green laser diodes 101 in each characteristic detection non-image-drawing period, and the photodiode 14 measures the amount of output light from each laser diode 101. In FIG. 25, a region in which the characteristic detection laser light is projected is indicated by a thick line so as to overlap the locus of scanning. As shown in FIGS. 23 and 25, the laser light source controller 6 controls the output of each laser diode 101 so that the characteristic detection laser light is output from the laser module 10 when the scanner 12 is scanning the outside of the scanning region SA. Specifically, the laser light source controller 6 controls the output of each laser diode 101 so that the characteristic detection laser light is output from the laser module 10 when the scanner 12 is scanning the upper side of the upper blanking region BAU. The masking shield 9 shown in FIG. 1 is disposed at a position where the characteristic detection laser light output from the laser module 10 is blocked when the scanner 12 is scanning the outside of the scanning region SA. According to the above processing, the position where the characteristic detection laser light is projected can be spaced apart from the drawing image position, without changing the drawing image shape and the drawing position. Therefore, it is possible to reduce the possibility that stray light generated due to a diffuse reflection of the characteristic detection laser light blocked by the masking shield 9 will be displayed in the drawing image region, thereby suppressing degradation in the quality of the drawing image.

Next, the characteristic detection controller 8 controls the laser light source controller 6 to acquire the measurement result from the photodiode 14 which has measured the amount of the characteristic detection laser light (S330), detect the actual output value of each laser diode 101 on the basis of the acquired measurement result (S340), and output an appropriate amount of laser light from each laser diode 101 on the basis of the detection result.

The sixth embodiment described above can be modified as follows.

In the sixth embodiment described above, as shown in FIGS. 23 and 25, the scanner 12 scans a region outside of the predetermined scanning region on the upper side of the upper blanking region BAU in the characteristic detection non-image-drawing period Q2IL. However, instead, in the characteristic detection non-image-drawing period Q2IL, the scanner 12 may scan a region outside of the predetermined scanning region on the lower side of the lower blanking region BAD, or may scan a region outside of the predetermined scanning region on the upper side of the upper blanking region BAU and on the lower side of the lower blanking region BAD. In any case, in the characteristic detection non-image-drawing period Q2IL, the scanner 12 scans the outside of the scanning region SA, and the characteristic detection laser light is output from the laser module 10 when the scanner 12 is scanning the outside of the scanning region SA.

The characteristic detection laser light may be output at any timing, as long as the timing is within the period in which the scanner 12 is scanning the outside of the scanning region SA. For example, the timing may be within the vertical return scan period P4, the upper blanking region scan period P1, or the lower blanking region scan period P3.

(Seventh Embodiment)

Next, a seventh embodiment will be described with reference to FIGS. 26 to 28. Differences between the seventh embodiment and the first embodiment will be mainly described below, while explanations which have already been given above will not be repeated.

In the sixth embodiment described above, as shown in FIG. 24, the vertical scan angle "a" is linearly changed in the upper blanking region scan period P1 of the characteristic detection non-image-drawing period Q2IL. On the other hand, in this embodiment, as shown in FIGS. 26 and 27, the vertical scan angle "a" is changed stepwise in the upper blanking region scan period P1 of the characteristic detection non-image-drawing period Q2IL. Accordingly, as shown in FIG. 28, a portion of the locus of the scanning position of the scanner 12 that is located above the image drawing region DA is further moved upward without changing its shape.

The seventh embodiment described above can be modified as follows.

Figure 26:
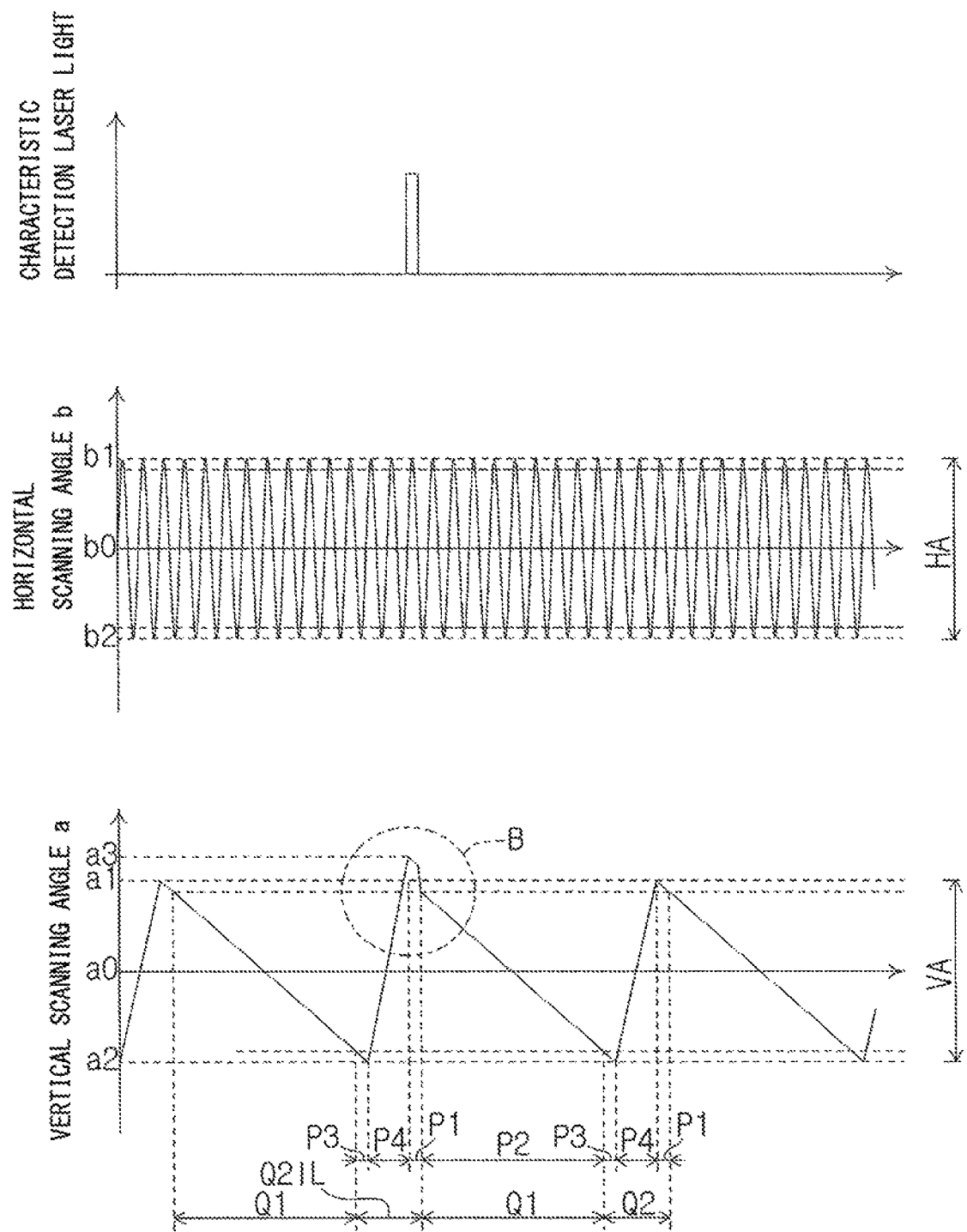
FIG. 26 is a graph schematically showing time variations of the vertical scan angle and the horizontal scan angle (seventh embodiment)
Figure 27:
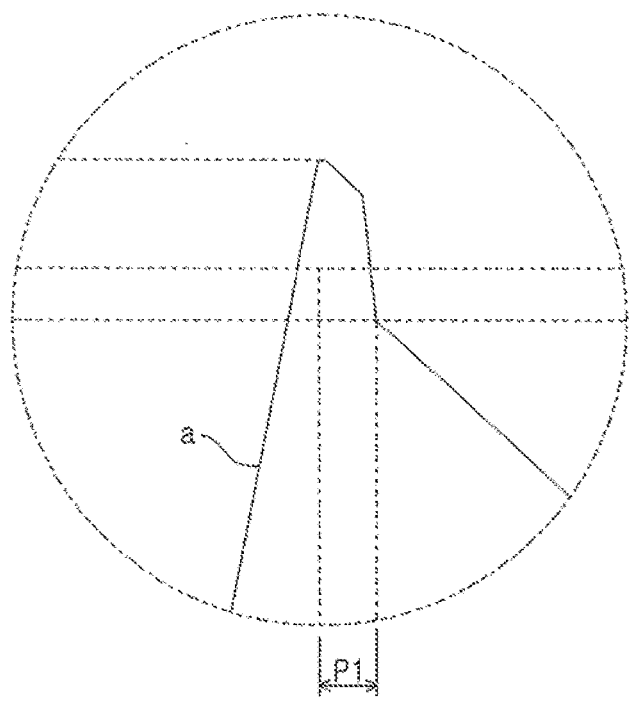
FIG. 27 is an extended view of a portion "B" shown in FIG. 26 (seventh embodiment)
Figure 28:
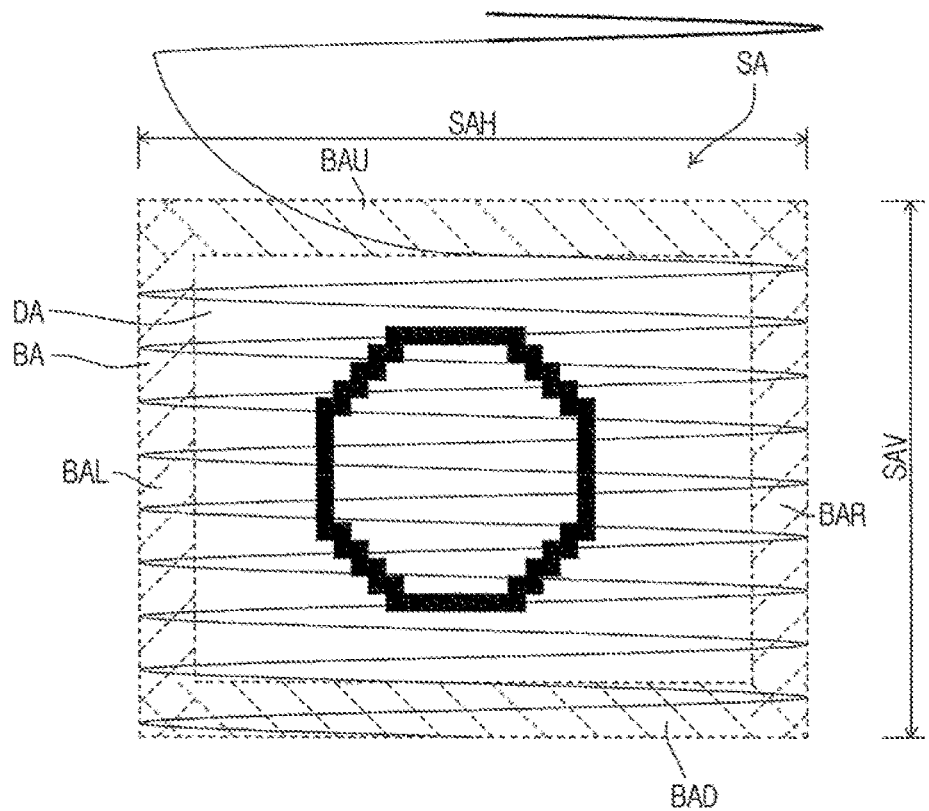
FIG. 28 is a diagram schematically showing a locus of scanning (seventh embodiment).

In the seventh embodiment, as shown in FIGS. 26 and 28, in the characteristic detection non-image-drawing period Q2IL, the scanner 12 scans a region outside of the predetermined scanning region on the upper side of the upper blanking region BAU. However, instead, in the characteristic detection non-image-drawing period Q2IL, the scanner 12 may scan a region outside of the predetermined scanning region on the lower side of the lower blanking region BAD, or may scan a region outside of the predetermined scanning region on the upper side of the upper blanking region BAU and on the lower side of the lower blanking region BAD. In any case, the scanner 12 scans the outside of the scanning region SA in the characteristic detection non-image-drawing period Q2IL, and the characteristic detection laser light is output from the laser module 10 when the scanner 12 is scanning the outside of the scanning region SA.

The characteristic detection laser light may be output at any timing, as long as the timing is within the period in which the scanner 12 is scanning the outside of the scanning region SA. For example, the timing may be within the vertical return scan period P4, the upper blanking region scan period P1, or the lower blanking region scan period P3.

The fifth, sixth, and seventh embodiments described above have the following features.

When the output value of the laser light output from the laser light source unit 3 is adjusted, the characteristic detection controller 8 controls the scanner controller 7 to cause the scanner 4 to perform scanning in a range beyond the scanning range corresponding to the predetermined amplitude by temporarily performing scanning with an amplitude extended from the predetermined amplitude. With the configuration described above, it is possible to prevent degradation in the drawing quality of the drawing image due to irradiation of the characteristic detection laser light output during the APC processing.

(1) The image drawing device 1 includes: the laser light source unit 3 which outputs laser light; the scanning unit 4 which scans the laser light output from the laser light source unit 3 by reflecting the laser light; the scanner controller 7 which controls scanning of the scanner 4 so that the scanner 4 scans the laser light with a predetermined amplitude; the laser light source controller 6 which controls a laser light output timing of the laser light source unit 3 and an output value of the laser light so that a drawing image based on input image data is generated by scanning of the scanner 4 in a predetermined scanning region scanned by the scanner 4, and controls the laser light source unit 3 to output the characteristic detection laser light so as to detect the output value of the laser light output from the laser light source unit 4; and the characteristic detection controller 8 which controls the scanner controller 7 to cause the scanner 4 to temporarily scan the outside of the predetermined scanning region when the output value of the laser light output from the laser light source unit 3 is adjusted, and controls the last light source controller 6 to output the characteristic detection laser light during scanning of the outside of the predetermined scanning region, thereby adjusting the output value of the laser light on the basis of the detection result of the output value of the laser light of the characteristic detection laser light. The scanning frequency in the vertical direction is lower than the scanning frequency in the horizontal direction. In vertical scanning, the image drawing period Q1 in which images are drawn and the non-image-drawing period Q2 in which no images are drawn are repeated on the temporal axis. The characteristic detection controller 8 controls scanning of the scanner 12 so that the scanner 12 temporarily scans the outside of the scanning region SA in the characteristic detection non-image-drawing period Q2IL of the non-image-drawing period Q2, and controls the output of each laser diode 101 so that the characteristic detection is output from the laser module 10 when the scanner 12 is scanning the outside of the scanning region SA, thereby detecting the amount of light from each laser diode 101. With the configuration described above, it is possible to prevent degradation in the drawing quality of the drawing image due to irradiation of the characteristic detection laser light output during APC processing.

According to the above configuration, image drawing can be normally executed in the image drawing period Q1.

(2) In the sixth and seventh embodiments, the characteristic detection controller 8 controls scanning of the scanner 12 so that the scanner 12 scans a region shifted from the scanning region SA in the vertical direction.

(3) In the fifth embodiment, the characteristic detection controller 8 controls scanning of the scanner 12 so that the scanner 12 scans a region shifted from the scanning region SA in the horizontal direction.

(4) In the image drawing method that causes the scanner 4, which scans laser light output from the laser light source unit 3, to reflect the laser light to generate a drawing image in a predetermined scanning region, when the output value of the laser light output from the laser light source unit 3 is adjusted, the scanner 4 temporarily scans a range including the outside of the predetermined scanning region. When the outside of the predetermined scanning region is scanned, characteristic detection laser light for detecting the output value of the laser light is output, and the output value of the laser light is adjusted on the basis of the detection result of the output value of the characteristic detection laser light. According to the above method, it is possible to prevent degradation in the drawing quality of the drawing image due to irradiation of the characteristic detection laser light output during APC processing.

According to the above method, image drawing can be normally executed in the image drawing period Q1.

This embodiment can be applied to an image drawing device and an image drawing method, and more particularly, to a laser scan type image drawing device and image drawing method, and thus the exemplary embodiment has an industrial applicability.

According to the exemplary embodiment, degradation in the drawing quality of the drawing image due to irradiation of laser light for detecting the output value of laser light can be suppressed.

What is claimed is:

1. An image drawing device comprising:
    a laser light source unit configured to output laser light;
    a scanner configured to scan the laser light output from the laser light source unit by reflecting the laser light;
    a laser light source controller configured to control a laser light output timing of the laser light source unit and an output value of the laser light so that a drawing image based on input image data is generated by scanning of the scanner in a scanning region scanned by the scanner, and controls the laser light source unit to output characteristic detection laser light for detecting the output value of the laser light output from the laser light source unit;
    a scanner controller configured to control scanning of the scanner so that the scanner scans the laser light with a predetermined amplitude; and
    a characteristic detection controller configured to control the scanner controller so that the scanner performs scanning in a range in which an amplitude of scanning of the scanner exceeds a scanning range corresponding to the predetermined amplitude when an output value of the laser light output from the laser light source unit is adjusted, control the laser light source controller to output the characteristic detection laser light during scanning in a region which is outside of a region in which the drawing image is generated and beyond the scanning range corresponding to the predetermined amplitude, and adjust the output value of the laser light based on a detection result of the output value of the characteristic detection laser light,
    wherein the characteristic detection controller controls the laser light source controller so that a drawing image based on image data indicating a single hue corresponding to an average hue of the input image data and a single luminance corresponding to an average luminance of the input image data is generated, instead of the drawing image based on the input image data, when the scanner is scanned with an amplitude extended from the predetermined amplitude.

2. The image drawing device according to claim 1, wherein the characteristic detection controller controls the scanner controller to perform scanning in a range beyond the scanning range corresponding to the predetermined amplitude by performing scanning with the extended amplitude from the predetermined amplitude, when the output value of the laser light output from the laser light source unit is adjusted.

3. The image drawing device according to claim 2, wherein the characteristic detection controller controls the laser light source controller so that the drawing image has a uniform size based on a ratio of the predetermined amplitude to the extended amplitude when the scanner is scanned with the extended amplitude.

4. The image drawing device according to claim 1, wherein the characteristic detection controller controls the scanner controller to perform scanning in a range beyond the scanning range corresponding to the predetermined amplitude by temporarily performing scanning with the extended amplitude from the predetermined amplitude, when the output value of the laser light output from the laser light source unit is adjusted.

5. The image drawing device according to claim 4, wherein
the scanner controller controls scanning of the scanner so that the scanner performs scanning with a predetermined amplitude in a first scanning direction and a second scanning direction, the first scanning direction corresponding to a vertical direction of the drawing image, the second scanning direction corresponding to a horizontal direction of the drawing image, and
the characteristic detection controller controls the scanner controller so that the scanner temporarily performs scanning in the first scanning direction with the extended amplitude from the predetermined amplitude, when the output value of the laser light output from the laser light source unit is adjusted.

6. The image drawing device according to claim 4, wherein
the scanner controller controls scanning of the scanner so that the scanner performs scanning with a predetermined amplitude in a first scanning direction and a second scanning direction, the first scanning direction corresponding to a vertical direction of the drawing image, the second scanning direction corresponding to a horizontal direction of the drawing image, and
the characteristic detection controller controls the scanner controller so that the scanner temporarily performs scanning in the second scanning direction with the extended amplitude from the predetermined amplitude, when the output value of the laser light output from the laser light source unit is adjusted.

7. The image drawing device according to claim 1, wherein
the scanner controller controls the scanner to perform scanning with a predetermined scanning center as a scanning center, and
the characteristic detection controller controls the scanner controller to perform scanning in a range beyond the scanning range corresponding to the predetermined amplitude by shifting the scanning center of the scanner from the predetermined scanning center, when the output value of the laser light output from the laser light source unit is adjusted.

8. An image drawing device comprising,
a laser light source unit configured to output laser light;
a scanner configured to scan the laser light output from the laser light source unit by reflecting the laser light;
a laser light source controller configured to control a laser light output timing of the laser light source unit and an output value of the laser light so that a drawing image based on input image data is generated by scanning of the scanner in a scanning region scanned by the scanner, and controls the laser light source unit to output characteristic detection laser light for detecting the output value of the laser light output from the laser light source unit;
a scanner controller configured to control scanning of the scanner so that the scanner scans the laser light with a predetermined amplitude; and
a characteristic detection controller configured to control the scanner controller so that the scanner performs scanning in a range in which an amplitude of scanning of the scanner exceeds a scanning range corresponding to the predetermined amplitude when an output value of the laser light output from the laser light source unit is adjusted, control the laser light source controller to output the characteristic detection laser light during scanning in a region which is outside of a region in which the drawing image is generated and beyond the scanning range corresponding to the predetermined amplitude, and adjust the output value of the laser light based on a detection result of the output value of the characteristic detection laser light,
wherein the scanner controller controls the scanner to perform scanning with a predetermined scanning center as a scanning center,
the characteristic detection controller controls the scanner controller to perform scanning in a range beyond the scanning range corresponding to the predetermined amplitude by shifting the scanning center of the scanner from the predetermined scanning center, when the output value of the laser light output from the laser light source unit is adjusted, and
when the scanner performs scanning with a scanning center shifted from the predetermined scanning center as a scanning center, the characteristic detection controller controls the laser light source controller so that a position of a drawing image drawn when scanning is performed with the predetermined scanning center as the scanning center matches a position of a drawing image drawn when scanning is performed with a scanning center shifted from the predetermined scanning center as the scanning center.

9. An image drawing device comprising,
a laser light source unit configured to output laser light;
a scanner configured to scan the laser light output from the laser light source unit by reflecting the laser light;
a laser light source controller configured to control a laser light output timing of the laser light source unit and an output value of the laser light so that a drawing image based on input image data is generated by scanning of the scanner in a scanning region scanned by the scanner, and controls the laser light source unit to output characteristic detection laser light for detecting the output value of the laser light output from the laser light source unit;

a scanner controller configured to control scanning of the scanner so that the scanner scans the laser light with a predetermined amplitude; and a characteristic detection controller configured to control the scanner controller so that the scanner performs scanning in a range in which an amplitude of scanning of the scanner exceeds a scanning range corresponding to the predetermined amplitude when an output value of the laser light output from the laser light source unit is adjusted, control the laser light source controller to output the characteristic detection laser light during scanning in a region which is outside of a region in which the drawing image is generated and beyond the scanning range corresponding to the predetermined amplitude, and adjust the output value of the laser light based on a detection result of the output value of the characteristic detection laser light, wherein the scanner controller controls the scanner to perform scanning with a predetermined scanning center as a scanning center, the characteristic detection controller controls the scanner controller to perform scanning in a range beyond the scanning range corresponding to the predetermined amplitude by shifting the scanning center of the scanner from the predetermined scanning center, when the output value of the laser light output from the laser light source unit is adjusted, and when the scanner performs scanning with a scanning center shifted from the predetermined scanning center as a scanning center, the characteristic detection controller controls the laser light source controller so that a drawing image based on image data indicating a single hue corresponding to an average hue of the input image data and a single luminance corresponding to an average luminance of the input image data is generated, instead of the drawing image based on the input image data.

* * * * *